(12) United States Patent
Gerardo et al.

(10) Patent No.: US 10,605,379 B2
(45) Date of Patent: Mar. 31, 2020

(54) CONDUCTOR GUIDE SYSTEM

(71) Applicant: Southwire Company, LLC, Carrollton, GA (US)

(72) Inventors: Joseph R. Gerardo, Victorville, CA (US); Andrew M. Gilmore, Villa Rica, GA (US)

(73) Assignee: Southwire Company, LLC, Carrollton, GA (US)

( * ) Notice: Subject to any disclaimer, the term of this patent is extended or adjusted under 35 U.S.C. 154(b) by 0 days.

(21) Appl. No.: 16/188,121

(22) Filed: Nov. 12, 2018

(65) Prior Publication Data

US 2019/0145549 A1   May 16, 2019

Related U.S. Application Data

(63) Continuation of application No. 15/205,294, filed on Jul. 8, 2016, now Pat. No. 10,125,896.

(60) Provisional application No. 62/189,896, filed on Jul. 8, 2015.

(51) Int. Cl.
| | |
|---|---|
| *F16L 3/00* | (2006.01) |
| *F16L 3/10* | (2006.01) |
| *H02G 1/06* | (2006.01) |
| *H02G 11/00* | (2006.01) |

(52) U.S. Cl.
CPC .............. *F16L 3/1075* (2013.01); *H02G 1/06* (2013.01); *H02G 11/00* (2013.01)

(58) Field of Classification Search
CPC .. H02G 3/32; H02G 3/26; H02G 3/30; H02G 3/0608; H02G 3/263

USPC ................. 248/65, 68.1, 73; 108/50.02, 36.1
See application file for complete search history.

(56) References Cited

U.S. PATENT DOCUMENTS

| | | |
|---|---|---|
| 3,110,479 A | 11/1963 | Eitel |
| 3,306,581 A | 2/1967 | Miller |
| 3,589,136 A | 6/1971 | Sorenson et al. |
| 3,602,467 A | 8/1971 | Thomas |
| 4,278,238 A | 7/1981 | Vugrek |

(Continued)

FOREIGN PATENT DOCUMENTS

| | | |
|---|---|---|
| CN | 203415908 U | 1/2014 |
| DE | 29719821 U1 | 2/1998 |

(Continued)

OTHER PUBLICATIONS

Stainless Steel Adjustable Square Tube Elbow, JINFER, retrieved at http://www.railglassfittings.com/4-1-14-adjustable-square-tube-elbow.html on Apr. 6, 2015.

(Continued)

*Primary Examiner* — Steven M Marsh
(74) *Attorney, Agent, or Firm* — Hartman & Citrin LLC

(57) ABSTRACT

A conductor guide system for guiding one or more conductors is disclosed. The conductor guide system can include a first base section and a second base section. A joint can be used to assemble the first base section and the second base section in series. The conductor guide system can further include a roller assembly for holding one or more conductors. The roller assembly, when mounted on one of the first base section or the second base section, holds the one or more conductors off of the one of the first base section or the second base section to which the roller assembly is mounted.

20 Claims, 17 Drawing Sheets

(56) References Cited

U.S. PATENT DOCUMENTS

| | | | | |
|---|---|---|---|---|
| 4,392,344 | A * | 7/1983 | Gordon | F16G 13/16 138/120 |
| 4,658,577 | A * | 4/1987 | Klein | H02G 11/006 248/49 |
| 4,661,018 | A | 4/1987 | Kinnan | |
| 4,672,805 | A * | 6/1987 | Moritz | F16G 13/16 248/49 |
| 5,240,209 | A * | 8/1993 | Kutsch | F16G 13/16 248/49 |
| 5,388,790 | A | 2/1995 | Guthke | |
| 5,779,198 | A | 7/1998 | Rutherford | |
| 5,871,306 | A | 2/1999 | Tilcox | |
| 6,348,658 | B1 | 2/2002 | Gutgsell | |
| 6,730,850 | B2 | 5/2004 | Tsutsumi et al. | |
| 6,948,701 | B2 | 9/2005 | Knoerzer et al. | |
| 8,958,681 | B2 | 2/2015 | Ripplinger | |
| 9,402,329 | B1 | 7/2016 | Chen | |

FOREIGN PATENT DOCUMENTS

| | | |
|---|---|---|
| DE | 20117813 U1 | 2/2002 |
| GB | 670158 | 4/1952 |
| WO | WO 2012/051655 | 4/2012 |

OTHER PUBLICATIONS

Cable Roller, Heavy Duty (PKGD), Greenlee, retrieved at http://www.greenlee.com/products/CABLE-ROLLER%2540c-HEAVY-DUTY-%28PKGD%29.html on Jun. 16, 2015.

Cable Joe Cable Pulley, Associated Telephone Industries, Inc., 2010, retrieved at http://www.associatedtelephone.com/product-cablejoecablepully on Apr. 6, 2015.

Black Box BasketPAC Cable Roller Kit, Black Box, CableOrganizer.com, LLC, 2002-2015, retrieved at http://www.cableorganizer.com/black-box/cable-roller-kit/ on Apr. 6, 2015.

Telescoping Square Tubing, Telespar, retrieved at http://eberliron.com/store/category/Telespar_for_Industrial_and_OEM/1240.html on Apr. 14, 2015.

U.S. Office Action dated Nov. 28, 2017 in U.S. Appl. No. 15/205,294.

U.S. Notice of Allowance dated Jun. 20, 2018 in U.S. Appl. No. 15/205,294.

* cited by examiner

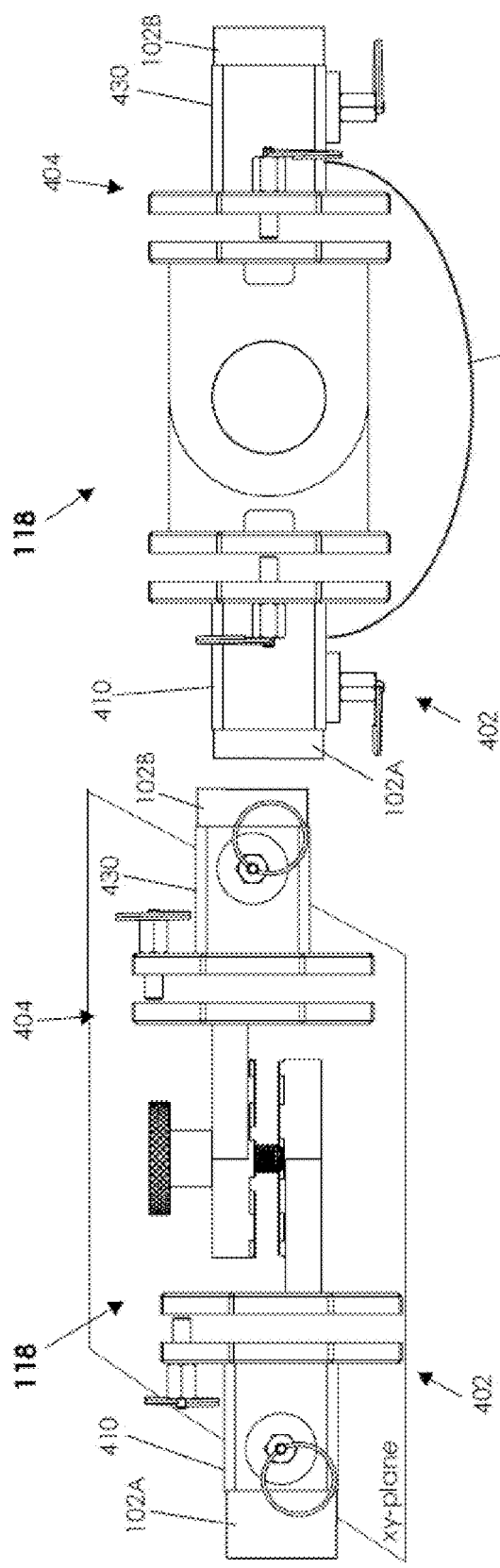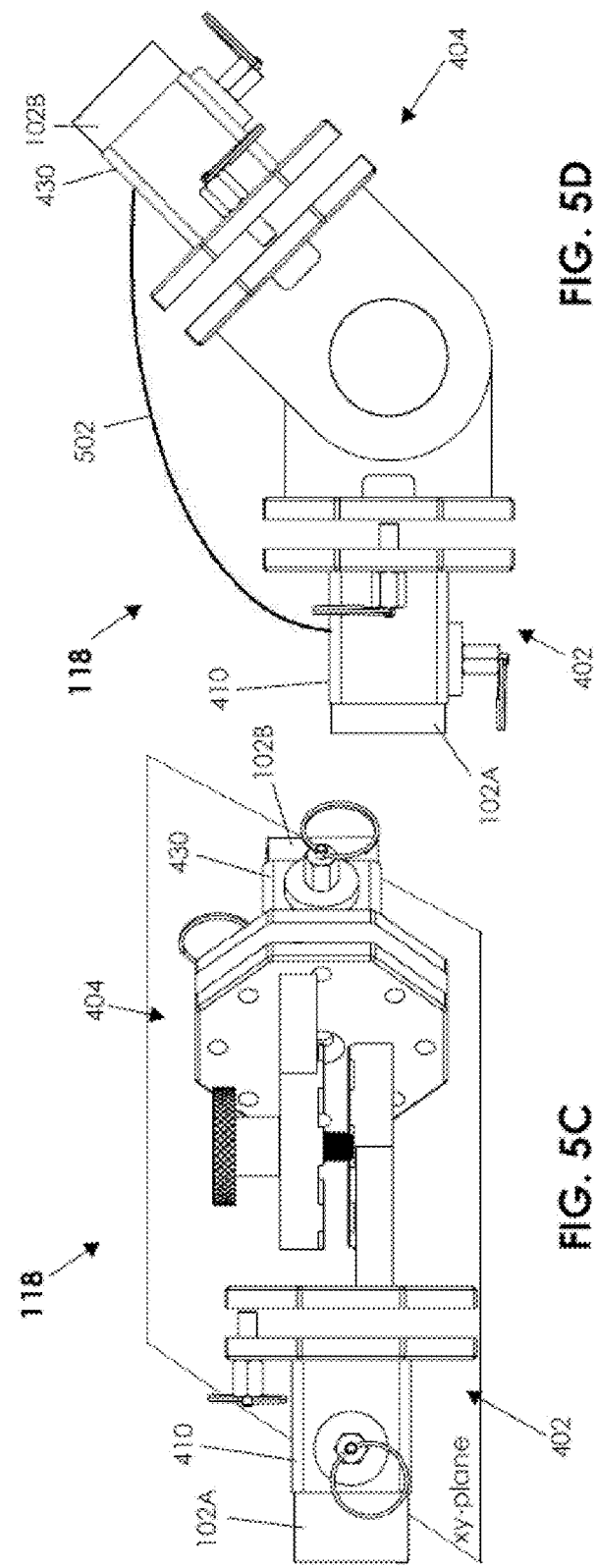

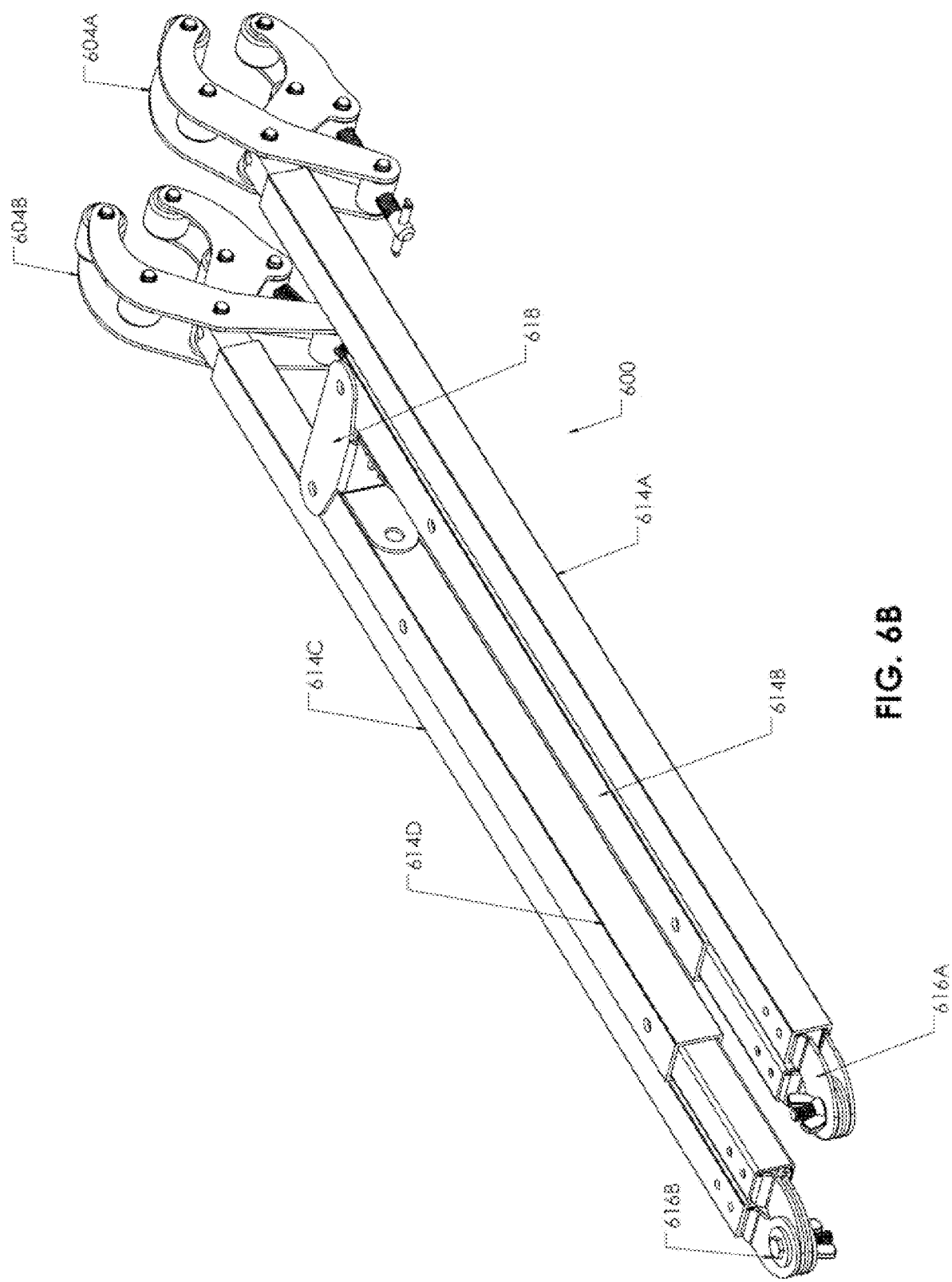

CONDUCTOR GUIDE SYSTEM

CROSS-REFERENCE TO RELATED APPLICATIONS

This application is a continuation of and claims priority to U.S. patent application Ser. No. 15/205,294, entitled "Conductor Guide System," filed Jul. 8, 2016, now U.S. Pat. No. 10,125,896, which is incorporated herein by reference in its entirety and which claims priority to U.S. Provisional Application No. 62/189,896, entitled "Conductor Guide System," filed Jul. 8, 2015, which is incorporated herein by reference in its entirety.

BACKGROUND

The present disclosure is directed to apparatuses and methods for guiding one or more conductors during installation. More particularly, the present disclosure is directed to a conductor guide system for guiding one or more conductors from a source, such as a conductor reel on which the conductors are loaded, to a destination, such as a conduit, raceway, or cable tray, for installation.

Electrical needs of modern facilities such as houses, apartment buildings, warehouses, manufacturing facilities, office buildings, and the like, have increased as the use of electrical devices has increased. During the construction of buildings or the upgrade of electrical/communication systems, conductors are typically pulled through a conduit from a source to electrical panels and power consumption sites. Because of the length of the conductors needed in certain installations, the conductors are typically wound around one or more conductor reels at an installation facility. A truck is typically used to transport the conductor reels, which may weigh several tons, from the installation facility where the conductors were loaded on the conductor reels to the site where the conductors are to be installed. The conductor reels are typically lifted from the truck transporting the conductor reels and moved to a location where the conductors are to be installed, such as proximate a conduit, raceway, or cable tray for receiving the conductors.

However, in some situations, geographical and structural limitations and barriers at a site prevent the conductor reels from being moved proximate the conduit, raceway, cable tray, or other destination for installation. In these situations, technicians are required to touch and manually guide the conductors as the conductors are pulled, typically with the aid of a puller system ("puller"), off the conductor reels and routed to the conduit, raceway, or cable tray for installation in order to direct the conductors along the route from the conductor reels to the conduit, raceway, or cable tray and protect the conductors from damage as the conductors move along the route. Depending on the distance between the source, such as the conductor reel, and the destination, such as a conduit, raceway, or cable tray, and the number and weight of the conductors being installed, multiple technicians may be required just to guide the conductors to the destination. In addition to increasing the amount of manpower needed at a site, requiring technicians to manually guide conductors from a source to a destination, as discussed above, exposes the technicians to possible injury, such as back and shoulder injuries caused by the exertion required to support and guide the conductors as the conductors move along the route from the source to the destination as well as finger and hand injuries from getting one or more fingers or hands caught between the conductors or between the conductors and the conduit as the conductors enter the conduit and/or getting one or more fingers or hands pinched between the conductors and a building structure on the route to the destination.

SUMMARY

The present disclosure is directed to a conductor guide system. According to various embodiments of the concepts and technologies described herein, the conductor guide system can include a first base section and a second base section. The first base section and the second base section can be assembled in series by a joint. A roller assembly for holding one or more linear elements can be mounted on either of the first base section or the second base section. The roller assembly, when mounted on either of the first base section or the second base section, can hold the one or more linear elements off of the base section on which the roller assembly is mounted.

In some embodiments, the conductor guide system can include a first base section and a second base section. The first base section and the second base section can be assembled in series by a joint. The joint can include a first pivot point, a second pivot point, and a third pivot point such that, when the first base section is assembled with the second base section in series by the joint, the first base section can be rotated relative to the second base section about the first pivot point, the second pivot point, and the third pivot point of the joint.

This Summary is provided to introduce a selection of concepts in a simplified form that are further described below in the Detailed Description. This Summary is not intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 5A-5F are side and top views of the joint of the conductor guide system assembled on a first base section and a second base section illustrating various angles afforded the base sections by the joint, according to illustrative embodiments.

FIGS. 6A-6B are perspective views of a reel attachment of the conductor guide system, according to illustrative embodiments.

DETAILED DESCRIPTION

The following detailed description is directed to systems, methods and apparatuses for guiding conductors. According to some implementations, a conductor guide system is used to guide conductors from a source, such as one or more conductor reels, to a destination, such as a conduit or raceway. Although the systems, methods, and apparatuses are sometimes described in the aforementioned context, it should be understood that the systems, methods, and apparatuses described herein may additionally or alternatively be used in other contexts to guide other linear elements such as, for example, a hose, rope, wire, cable, and/or line through a route from a source to a destination. As such, the particular implementations described herein should not be construed as being limiting in any way. This description provides various components, one or more of which may be included in particular implementations of the systems and apparatuses disclosed herein. In illustrating and describing these various components, however, it is noted that implementations of the embodiments disclosed herein may include any combination of these components, including combinations other than those shown in this description.

Figure 1:
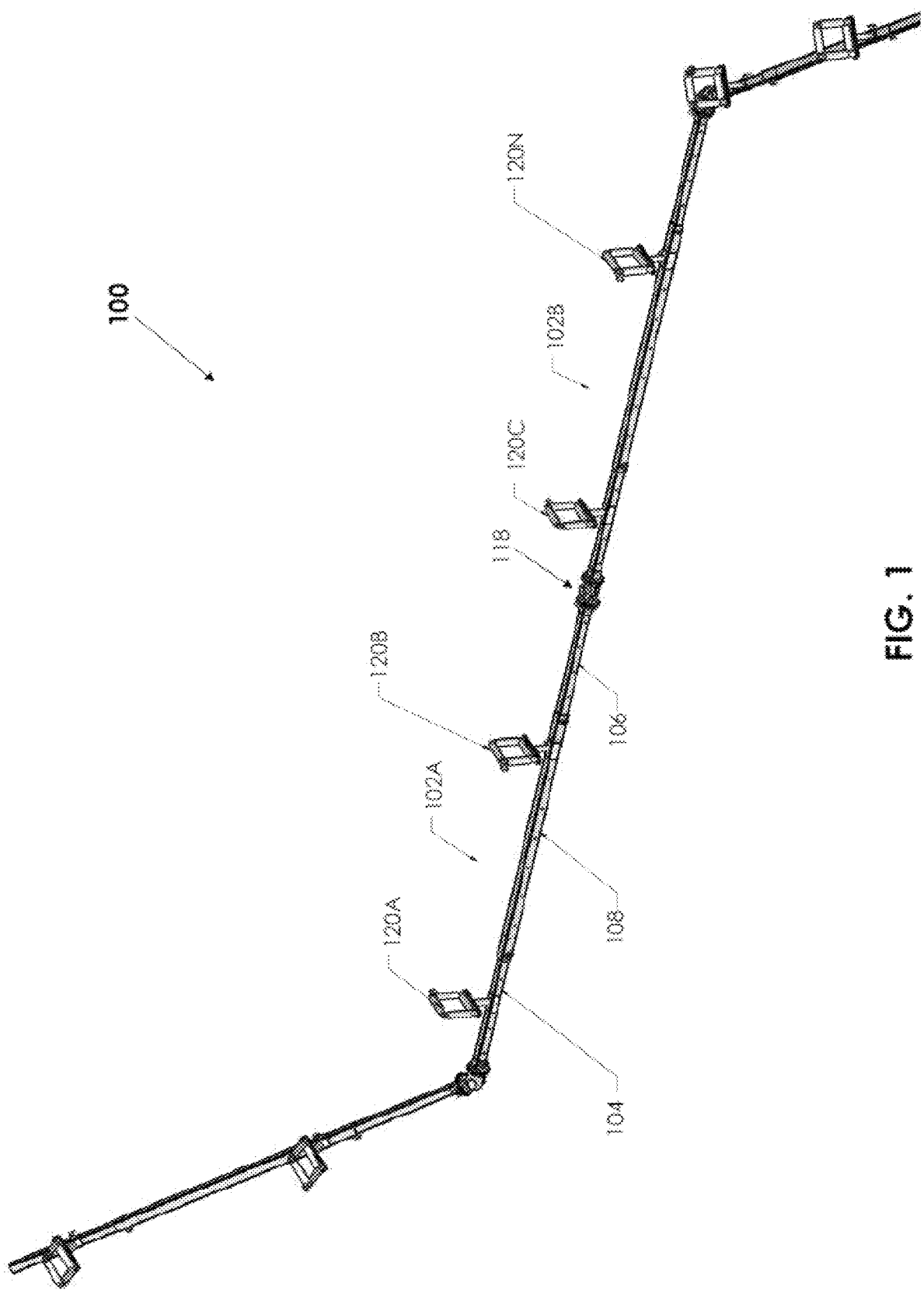
FIG. 1 is a perspective view of a conductor guide system, according to illustrative embodiments.

Turning now to FIG. 1, a perspective view of a conductor guide system 100 will be described in detail in accordance with an illustrative embodiment. The conductor guide system 100 includes a first base section 102A and a second base section 102B connected together in series by a joint 118. As described further herein, the joint 118 allows the conductor guide system 100 to be configured in a plurality of arrangements to accommodate the topography, including bends, corners, elevations, and depressions, of a route traveled by conductors from a source of the conductors, such as a conductor reel, to a destination of the conductors, such as a conduit, raceway, or cable tray. The conductor guide system 100 further includes a plurality of roller assemblies 120A-120N attached to the first and second base sections 102A-B for receiving, maintaining, and guiding one or more conductors as the conductors are pulled from a source to a destination. According to embodiments, one or more conductors are fed into the roller assemblies 120A-120N to route and guide the conductors from a source, such as a conductor reel, to a destination, such as a conduit, raceway, or cable tray. As the conductors are pulled through the roller assemblies 120A-120N, the roller assemblies 120A-120N hold the conductors off of the base sections of the guide assembly, such as the first and second base sections 102A and 102B, and off of the ground and away from obstructions, floor debris, or anything else that may damage or compromise the conductors and/or the insulation, jacket, or sheath of the conductors. As will be described and illustrated further herein, the conductor guide system 100 allows the conductors to travel over any type of topography that may exist between a source and a destination without requiring multiple technicians to manually guide the conductors. In particular, the conductor guide system 100 allows the conductors to traverse over flat surfaces, up elevations, and down depressions as well as maneuver around corners as the conductors are pulled from a source to a destination.

Although only two base sections (the first and second base sections 102A-B), one joint (the joint 118), and eight roller assemblies (including the roller assemblies 120A-120N) are shown in FIG. 1, the conductor guide system 100 may include any number of base sections and corresponding joints for connecting the base sections together in series as well as any number of roller assemblies for guiding the conductors as they are pulled from a source to a destination. According to some embodiments, the distance between a source of one or more conductors, such as a conductor reel, to a destination for the conductors, such as a conduit, raceway, or cable tray, drives the number of base sections, corresponding joints, and roller assemblies needed to guide the conductors from the source to the destination. According to further embodiments, the conductor guide system 100 may include just one base section and one or more of the roller assemblies 120A-120N. Moreover, since the construction of the first base section 102A is similar to the construction of the second base section 102B, the following discussion focuses on the first base section 102A with the understanding that the description also applies to the second base section 102B or any other base section of the conductor guide system 100. Although the term "conductors" is used throughout the specification, it should be understood that any linear element such as a hose, rope, or line can be guided by the conductor guide system 100 and that terms such as wire, cable, conductor, or any equivalent terms may be used interchangeably throughout this description. A "conductor" as used herein may be any material that allows energy transmission through the material, and non-limiting examples of conductors include electrical wire and fiber optic cable.

Figure 2A:
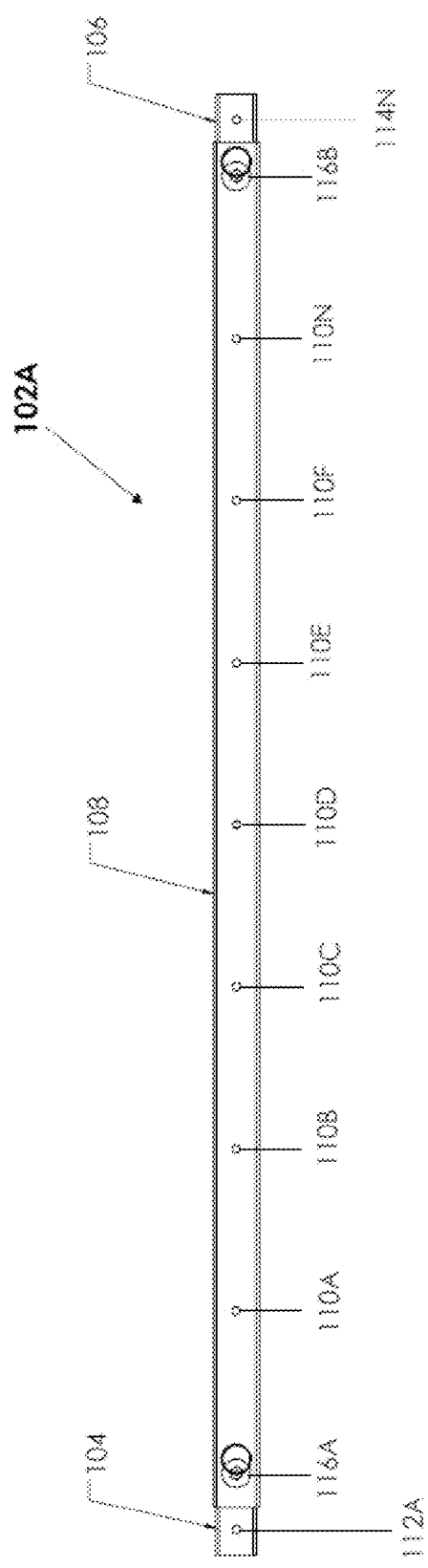
FIGS. 2A-2B are side views of a base section of the conductor guide system, according to an illustrative embodiment.
Figure 2B:
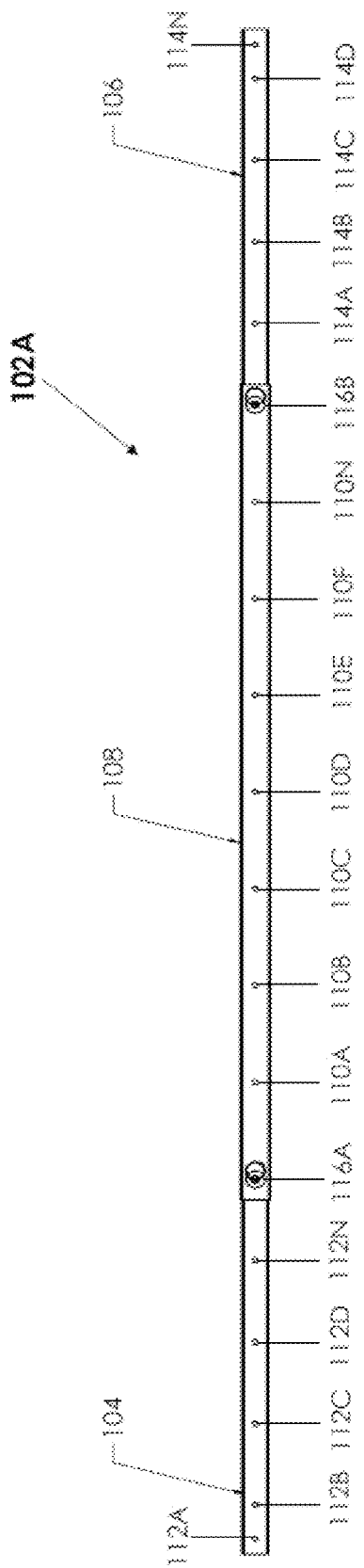
Figure 2C:
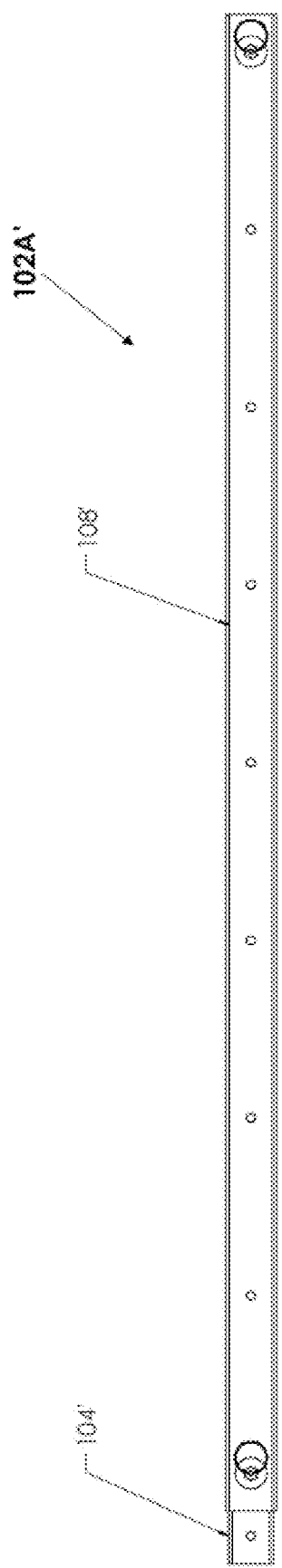
FIGS. 2C-2D are side views of a base section of the conductor guide system, according to an alternative embodiment.
Figure 2D:
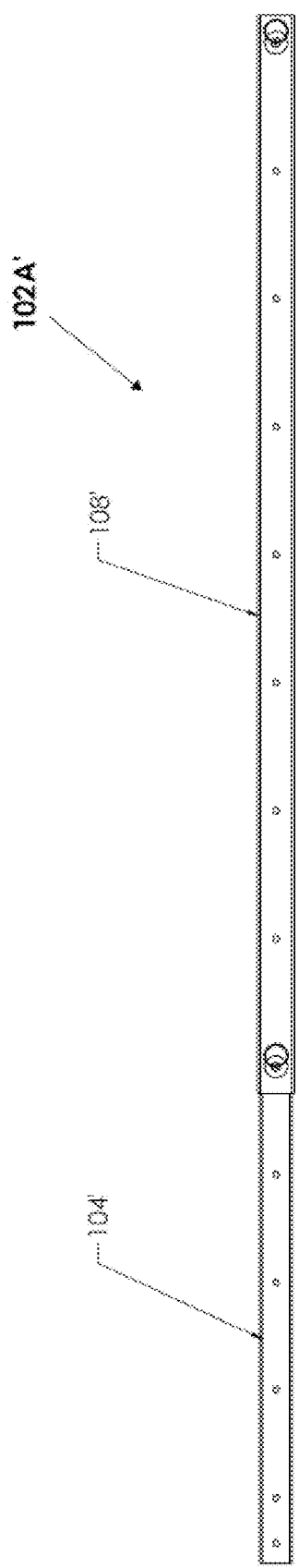

In some embodiments, the first base section 102A of the conductor guide system 100 includes telescoping tubular members. As illustrated in FIGS. 1 and 2A-2B, the first base section 102A may include a first tubular member 104 and a second tubular member 106 both having a size that will telescope, or slide, within a third tubular member 108 to condense the overall length of the first base section 102A when the first tubular member 104 and the second tubular member 106 are retracted within the third tubular member 108. According to some embodiments, the outside diameter of both the first tubular member 104 and the second tubular member 106 is 1.75"×1.75", and the inside diameter of the third tubular member 108 is 1.81"×1.81", allowing the first tubular member 104 and the second tubular member 106 to slide within the third tubular member 108, although other outside diameters for the first and second tubular members 104, 106 and other inside diameters for the third tubular member 108 are contemplated and covered by the description. While the first base section 102A is illustrated with three telescoping tubular members, it should be understood that the first base section 102A may include fewer tubular members. For example, as illustrated in FIGS. 2C-2D, a first base section 102A' may include a first tubular member 104' having a size that will telescope, or slide, within a second tubular member 108' to condense the overall length of the first base section 102A' when the first tubular member 104' is retracted within the second tubular member 108'. Alternatively, it should be understood that the first base section 102A may include more than three telescoping tubular members to increase the overall length of the first base section 102A. For example, the first base section 102A may include additional tubular members that retract within the first tubular member 104 and/or the second tubular member 106 and then ultimately within the third tubular member 108. The telescoping action of each of the base sections, such as the first and second base sections 102A-B, making up the conductor guide system 100 allows the conductor guide system 100 to be condensed into a compact space such that approximately fifty feet of extendibility of the conductor guide system 100 is transportable on a two-wheeled dolly.

In some embodiments, the first and second tubular members 104, 106 have square cross sections that correspond with the square cross section of the third tubular member 108 of the first base section 102A, which provide for a stable foundation for the roller assemblies 120A-120N of the conductor guide system 100. The cross sections of the first, second, and third tubular members 104, 106, and 108 may take other shapes such as, for example, rectangle, triangle, flat oval, hexagon, other polygon, or irregular. The first, second, and third tubular members 104, 106, and 108 may be formed from metal, plastic, carbon composite, rubber, other materials, and/or combinations thereof. As shown in FIGS. 1 and 2A-2B and discussed with reference to FIGS. 2A-2B, the third tubular member 108 includes a plurality of holes 110A-110N passing through a first side of the third tubular member 108 and a plurality of corresponding holes (not shown) passing through a second side opposite the first side of the third tubular member 108.

According to embodiments, the first tubular member 104 also includes a plurality of holes 112A-112N passing through a first side of the first tubular member 104 and a plurality of corresponding holes (not shown) passing through a second side opposite the first side of the first tubular member 104. The second tubular member 106 also includes a plurality of holes 114A-114N passing through a first side of the second tubular member 106 and a plurality of corresponding holes (not shown) passing through a second side opposite the first side of the second tubular member 106. In some embodiments, at least a portion of the plurality of holes 112A-112N and the plurality of corresponding holes of the first tubular member 104 are spaced to correspond to and align with at least a portion of the plurality of holes 110A-110N and the plurality of corresponding holes of the third tubular member 108, respectively, when at least a portion of the first tubular member 104 is retracted within at least a portion of the third tubular member 108. When at least a portion of the first tubular member 104 is retracted within at least a portion of the third tubular member 108, a roller assembly, such as the roller assembly 120A, may be assembled on the first base section 102A by engaging, with pin assemblies of the roller assembly 120A discussed further with reference to FIG. 3A, a hole and its corresponding hole, such as the hole 110B and its corresponding hole, of the third tubular member 108 as well as a hole and its corresponding hole, such as the hole 112D and its corresponding hole, of the first tubular member 104 that are aligned with the hole 110B and its corresponding hole of the third tubular member 108.

Similarly, at least a portion of the plurality of holes 114A-114N and the plurality of corresponding holes of the second tubular member 106 are spaced to correspond to and align with at least a portion of the plurality of holes 110A-110N and the plurality of corresponding holes of the third tubular member 108, respectively, when at least a portion of the second tubular member 106 is retracted within at least a portion of the third tubular member 108. When at least a portion of the second tubular member 106 is retracted within at least a portion of the third tubular member 108, a roller assembly, such as the roller assembly 120B, may be assembled on the first base section 102A by engaging, with pin assemblies of the roller assembly 120B discussed further with reference to FIG. 3A, a hole and its corresponding hole, such as the hole 110F and its corresponding hole, of the third tubular member 108 as well as a hole and its corresponding hole, such as the hole 114B and its corresponding hole, of the second tubular member 106 that are aligned with the hole 110F and its corresponding hole of the third tubular member 108.

According to embodiments, the first base section 102A also includes one or more pin assemblies for locking the first and second tubular members 104 and 106 relative the third tubular member 108 and, in some embodiments, connecting the first base section 102A with the joint 118. As shown in FIGS. 2A-2B, the first base section 102A may include a plurality of pin assemblies 116A-116B. Each of the pin assemblies 116A-116B comprises a retractable stop member, such as a pin or plunger, that extends through an opening in the third tubular member 108 and into a hole aligned with the pin assembly to engage and hold in place whatever is associated with the hole, when the pin assembly is placed in an engaged position. To disengage each of the pin assemblies 116A-116B, a handle or ring of the pin assembly is pulled back to retract the stop member from the hole aligned with the pin assembly.

When the pin assembly 116A of the third tubular member 108 is placed in the engaged position, such as when the handle or ring is released, the pin or plunger of the pin assembly 116A extends through an opening in the third tubular member 108 and into one of the holes 112A-112N of the first tubular member 104 aligned with the pin assembly 116A to lock the first tubular member 104 relative to the third tubular member 108. To disengage the pin assembly 116A, the pin assembly 116A is put in a retracted position by pulling back on the handle or ring of the pin assembly 116A to retract the pin or plunger of the pin assembly 116A from the hole of the first tubular member 104 aligned with the pin assembly 116A. The first tubular member 104 can then be slid toward or away from the third tubular member 108 to retract or expand, respectively, the first tubular member 104 relative the third tubular member 108. As the first tubular member 104 is slid relative to the third tubular member 108, the pin assembly 116A can be moved back to the engaged position by releasing the handle or ring to cause the pin or plunger of the pin assembly 116A to engage any of the plurality of holes 112A-112N of the first tubular member 104 that align with the pin assembly 116A so as to lock the first tubular member 104 relative to the third tubular member 108, allowing the first base section 102A to be retracted or extended to a plurality of overall lengths as may be demanded by a particular route from a source to a destination.

When the pin assembly 116B of the third tubular member 108 is placed in the engaged position, such as when the handle or ring is released, the pin or plunger of the pin assembly 116B extends through an opening in the third tubular member 108 and into one of the holes 114A-114N of the second tubular member 106 aligned with the pin assembly 116B to lock the second tubular member 106 relative to the third tubular member 108. To disengage the pin assembly 116B, the pin assembly 116B is put in a retracted position by pulling back on the handle or ring of the pin assembly 116B to retract the pin or plunger of the pin assembly 116B from the hole of the second tubular member 106 aligned with the pin assembly 116B. The second tubular member 106 can then be slid toward or away from the third tubular member 108 to retract or expand, respectively, the second tubular member 106 relative the third tubular member 108. As the second tubular member 106 is slid relative to the third tubular member 108, the pin assembly 116B can be moved back to the engaged position by releasing the handle or ring to cause the pin or plunger of the pin assembly 116B to engage any of the plurality of holes 114A-114N of the second tubular member 106 that align with the pin assembly 116B so as to lock the second tubular member 106 relative to the third tubular member 108, allowing the first base section 102A to be retracted or extended to a plurality of overall lengths as may be demanded by a particular route from a source to a destination.

Non-limiting examples of the pin assemblies 116A-116B include spring-loaded pull pins and indexing plungers that are affixed to the third tubular member 108. Alternatively, the pin assemblies 116A-116B may include a quick release pin, and the openings on the third tubular member 108 for receiving the quick release pins may be similar to the plurality of holes 110A-110N of the third tubular member 108.

Figure 3A:
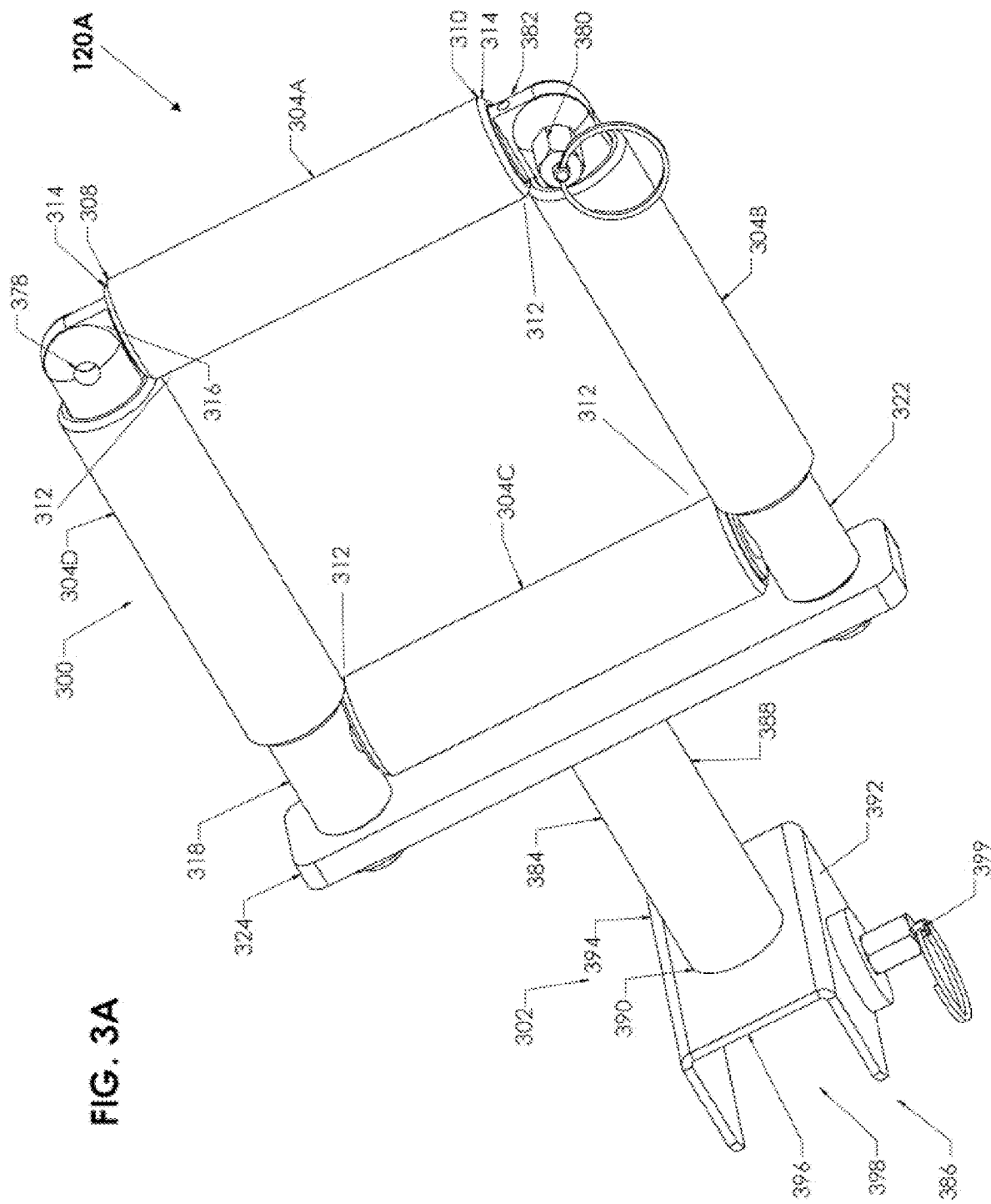
FIGS. 3A-3B are perspective views of a roller attachment and an exploded view of the roller attachment of the conductor guide system, respectively, according to an illustrative embodiment.
Figure 3B:
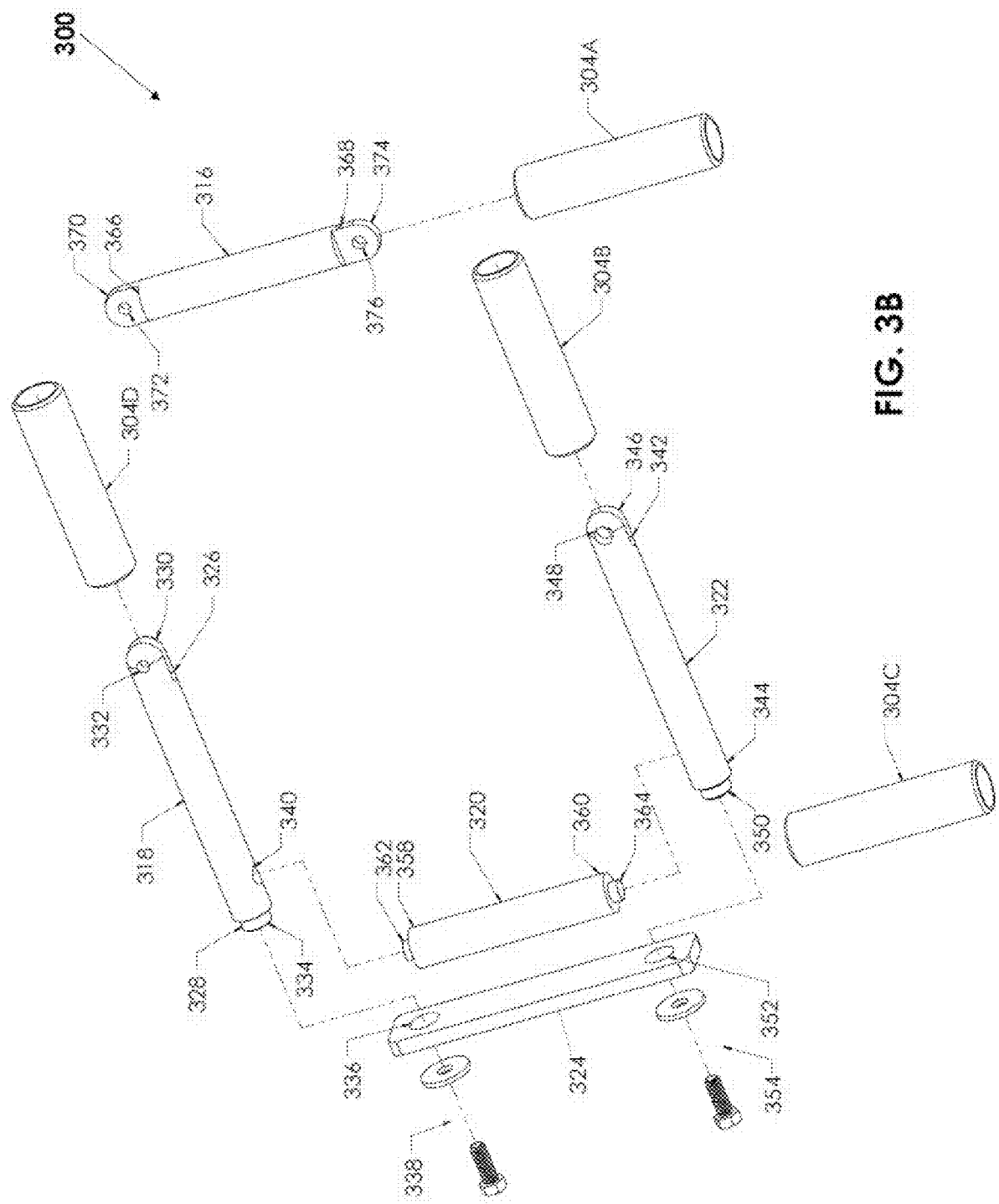

Turning now to FIGS. 3A-3B, the roller assemblies 120A-120N will be described in detail in accordance with an illustrative embodiment. Since the construction of each of the roller assemblies 120A-120N is similar, the following discussion focuses on the roller assembly 120A with the understanding that the description also applies to each of the remaining plurality of roller assemblies 120B-120N. According to illustrative embodiments and as shown in FIG. 3A, the roller assembly 120A includes a head portion 300 for receiving, maintaining, and aiding in guiding one or more conductors being pulled from a source to a destination. The roller assembly 120A further includes a mount portion 302 connected to the head portion 300 for attaching the roller assembly 120A to one of the base sections, such as the first base section 102A, of the conductor guide system 100.

Figure 3C:
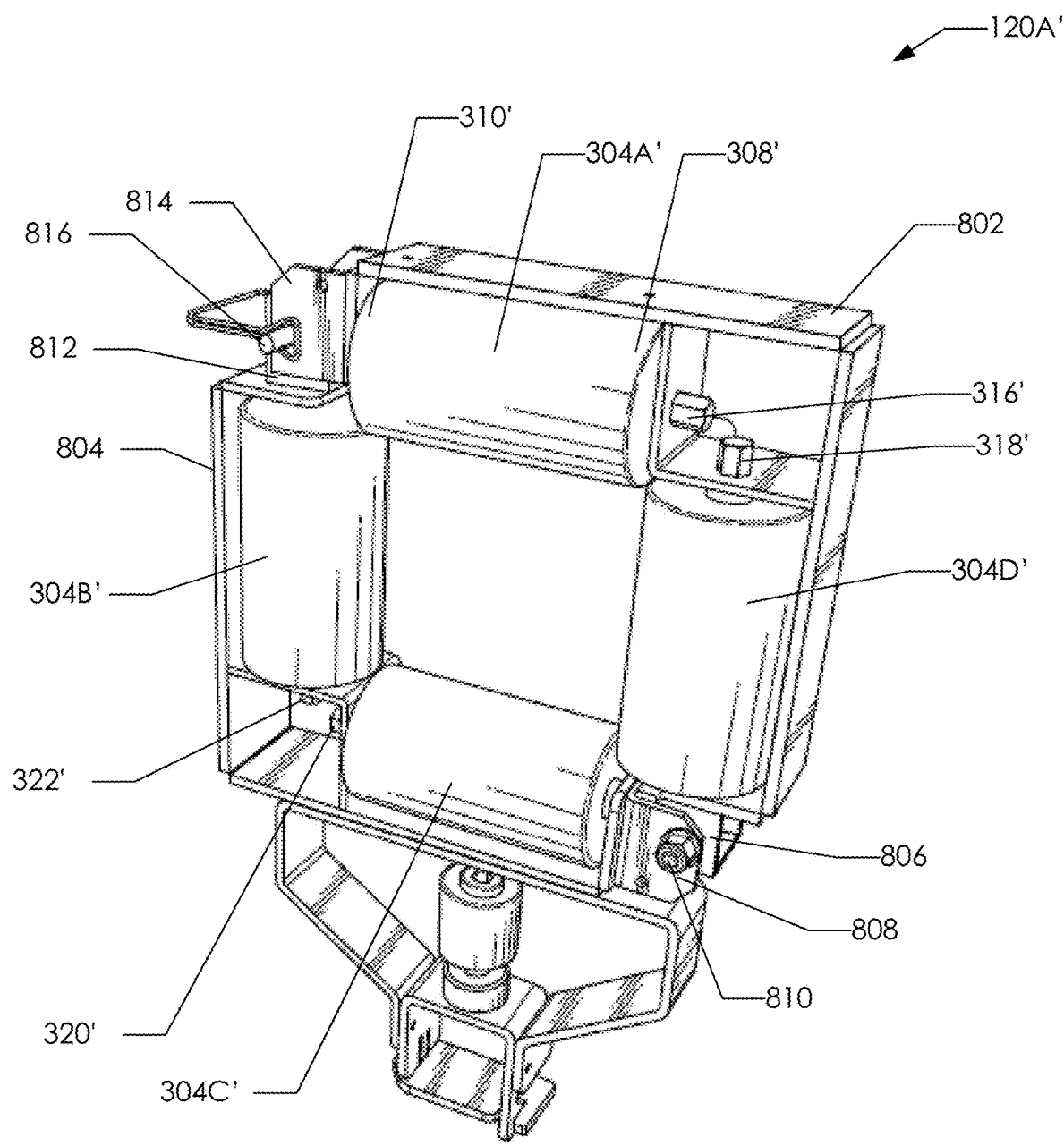
FIGS. 3C-3E are perspective views of a roller attachment of the conductor guide system, according to an alternative illustrative embodiment.
Figure 3D:
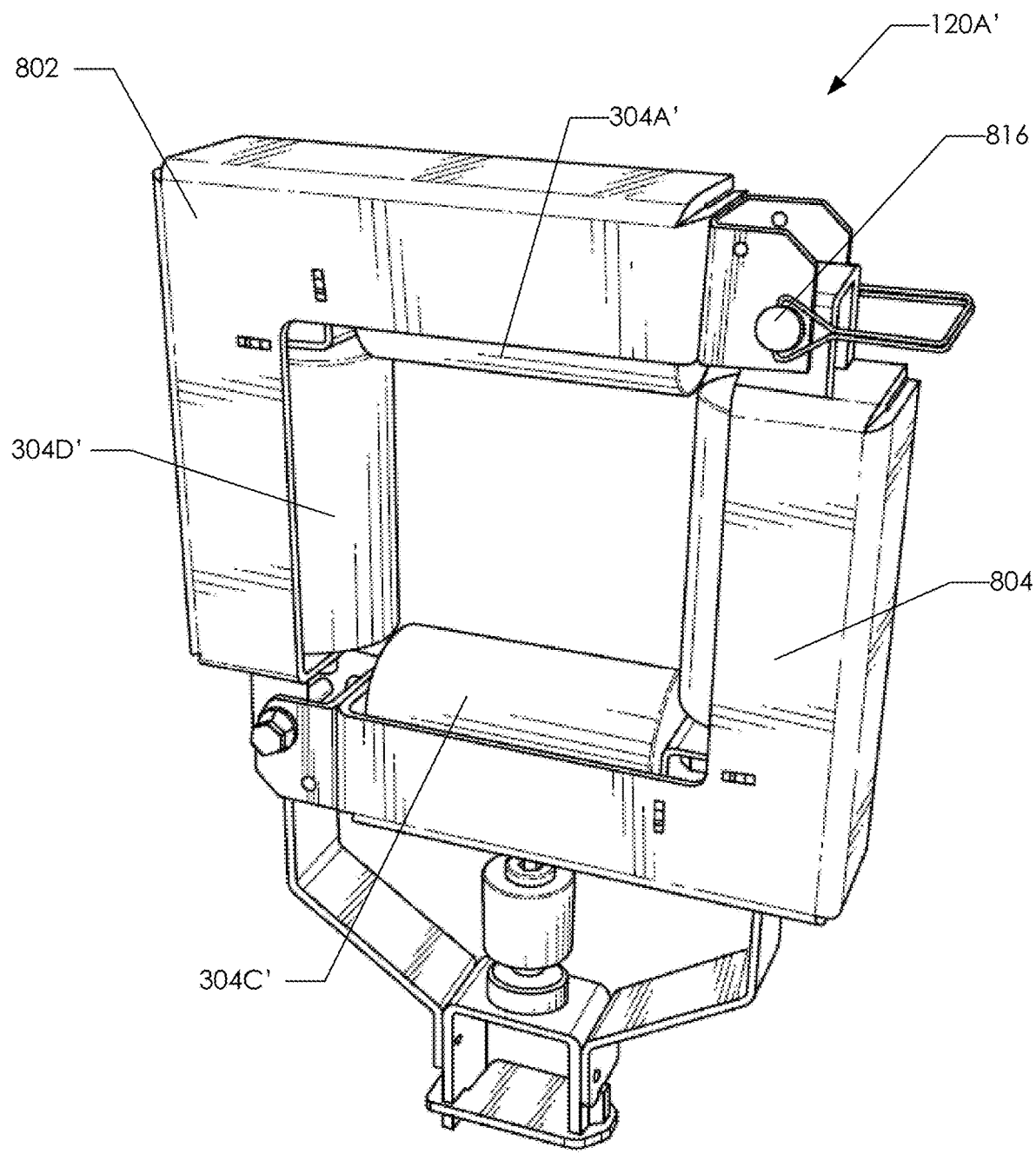

The head portion 300 comprises one or more rollers 304A-304D that rotate freely relative to the roller assembly 120A as one or more conductors, being pulled along a route from a source to a destination, roll over the rollers 304A-304D. According to some embodiments, each of the rollers 304A-304D defines an interior cavity for receiving one of a plurality of supports 316, 318, 320, and 322, as discussed further herein with reference to FIG. 3B. Each of the rollers 304A-304D, as represented by the roller 304A, has a first end 308 and a second end 310 spaced apart from and opposite the first end 308. As shown in FIG. 3A, starting at a center point of the roller 304A and traversing in opposite directions along a longitudinal axis of the roller 304A towards the first end 308 and the second end 310, the roller 304A transitions from being generally cylindrical in shape to sloping inward at an angle 314 at both the first end 308 and the second end 310, according to some embodiments. Alternatively, the roller 304A may transition from having a generally cylindrical shape to flaring outward at first angles and then sloping back inward at second angles at the first and second ends 308, 310 to create ridges at the first and second ends 308, 310. According to further alternative embodiment, and as illustrated in FIGS. 3C and 3D, the roller 304A' has a generally cylindrical shape throughout from the first end 308' to the second end 310'. When the roller assembly 120A is constructed, as shown in FIG. 3A, the angles 314 of each of the rollers 304A-304D align with one of the angles 314 of two neighboring rollers to create an interior corner 312 between each neighboring roller of the rollers 304A-304D that prevents conductors from being damaged by getting snagged, caught, or pinched between the rollers 304A-304D as the conductors are fed through the roller assembly 120A. The rollers 304A-304D may be formed from metal, plastic, carbon composite, rubber, other materials, and/or combinations thereof.

Turning now to FIG. 3B, the supports 316, 318, 320, and 322, interlock with one another and mount on a bracket 324 to form, along with the rollers 304A-304D, the head portion 300. Considering FIG. 3B, the support 318 has a first end 326 and a second end 328 spaced apart from and opposite the first end 326. According to some embodiments, the first end 326 includes a groove 330 and a first hole 332 for interlocking the support 318 with the support 316, as discussed further herein. The groove 330 may be cut along a longitudinal axis of the support 318, and the first hole 332, which extends perpendicular to the longitudinal axis of the support 318, may be a blind hole that extends from a front of the support 318 through to the groove 330 or may be a through hole that extends from the front of the support 318 through to a back of the support 318.

According to illustrative embodiments, a projection 334 extends outward from the second end 328 of the support 318 for insertion into a first hole 336 of the bracket 324. As shown in FIG. 3B, the projection 334 may have a diameter smaller than a diameter of the support 318. According to some embodiments, the projection 334 defines an opening extending in the direction of the longitudinal axis of the support 318 for receiving a screw, bolt, or other fastener of a fastening assembly 338, which may also include a washer, to secure the support 318 to the bracket 324. The support 318 may further include a second hole 340 for interlocking the support 318 with the support 320, as described further herein. The second hole 340 may be a blind hole that extends perpendicular to the longitudinal axis of the support 318 from a first side of the support 318 through at least a portion of the support 318 or may be a through hole that extends perpendicular to the longitudinal axis of the support 318 from a first side of the support 318 through to a second side of the support 318 opposite the first side.

Continuing to consider FIG. 3B, the support 322 has a first end 342 and a second end 344 spaced apart from and opposite the first end 342. According to some embodiments, the first end 342 includes a groove 346 and a first hole 348 for securing the support 322 to the support 316, as discussed further herein. The groove 346 may be cut along a longitudinal axis of the support 322, and the first hole 348, which extends perpendicular to the longitudinal axis of the support 322, may be a blind hole that extends from a front of the support 322 through to the groove 346 or may be a through hole that extends from the front of the support 322 through to a back of the support 322.

A projection 350 extends outward from the second end 344 of the support 322 for insertion into a second hole 352 of the bracket 324. As shown in FIG. 3B, the projection 350 may have a diameter smaller than a diameter of the support 322. According to some embodiments, the projection 350 defines an opening extending in the direction of the longitudinal axis of the support 322 for receiving a screw, bolt, or other fastener of a fastening assembly 354, which may also include a washer, to secure the support 322 to the bracket 324. The support 322 may further include a second hole (not shown), similar to the second hole 340 of the support 318, for interlocking the support 322 with the support 320, as described further herein. The second hole of the support 322 may be a blind hole that extends perpendicular to the longitudinal axis of the support 322 from a first side of the support 322 through at least a portion of the support 322 or may be a through hole that extends perpendicular to the longitudinal axis of the support 322 from a first side of the support 322 through to a second side of the support 322 opposite the first side.

As discussed briefly above, the supports 318 and 322 interlock with the support 320, which has a first end 358 and a second end 360 spaced apart from and opposite the first end 358. According to some embodiments, a first protrusion 362 extends outward from the first end 358 of the support 320 for insertion into the second hole 340 of the support 318, and a second protrusion 364 extends outward from the second end 360 of the support 320 for insertion into the second hole (not shown) of the support 322. The depth of the second hole 340 of the support 318 and the length of the first protrusion 362 of the support 320 may correspond such that, when the first protrusion 362 is inserted into the second hole 340 of the support 318, the first end 358 of the support 320 sits flush with the surface of the support 318. Similarly, the depth of the second hole (not shown) of the support 322 and the length of the second protrusion 364 may correspond such that, when the second protrusion 364 is inserted into the second hole of the support 322, the second end 360 of the support 320 sits flush with the surface of the support 322.

The supports 318 and 322 also interlock with the support 316, which has a first end 366 and a second end 368 spaced apart from and opposite the first end 366. According to some embodiments, a first tab 370 extends outward from the first end 366 of the support 316 and is sized to be received within the groove 330 of the support 318. The first tab 370 includes a hole 372 that aligns with the first hole 332 of the support 318 when the first tab 370 of the support 316 is inserted within the groove 330 of the support 318. As shown in FIG. 3A, a fastener 378, such as a pin, rod, or other fastening device, may then be inserted through the first hole 332 of the support 318 and the hole 372 of the first tab 370 of the support 316 to connect the supports 316 and 318 together. According to some embodiments, the assembly of the first tab 370 of the support 316, the groove 330 of the support 318, and the fastener 378 acts as a hinge allowing the support 316 to rotate about the fastener 378, as described further herein.

Continuing with FIG. 3B, the support 316, according to some embodiments, also includes a second tab 374 that extends outward from the second end 368 of the support 316 and is sized to be received within the groove 346 of the support 322. The second tab 374 includes a hole 376 that aligns with the first hole 348 of the support 322 when the second tab 374 of the support 316 is inserted within the groove 346 of the support 322. As shown in FIG. 3A, a pin assembly 380 may then be used to selectively lock the supports 316 and 322 together. The pin assembly 380 may include a retractable pin or plunger allowing the supports 316 and 322 to be selectively locked and unlocked relative to one another. For instance, when the pin assembly 380 is in an engaged position, the pin or plunger is inserted within the first hole 348 of the support 322 and the hole 376 of the second tab 374 to interlock the supports 316 and 322 together by locking the second tab 374 of the support 316 within the groove 346 of the support 322, which puts the roller assembly 120A in a closed configuration, as illustrated in FIG. 3A. When the pin assembly 380 is in a released position, such as when a ring or handle of the pin assembly 380 is pulled, the pin or plunger is retracted from the first hole 348 of the support 322 and the hole 376 of the second tab 374 to unlock the supports 316 and 322, allowing the second tab 374 of the support to be withdrawn from the groove 346 of the support 322 when the support 316 is rotated upward about the fastener 378, which puts the roller assembly 120A in an open configuration, as discussed further herein. Non-limiting examples of the pin assembly 380 include spring-loaded pull pins, indexing plungers, and quick release pins.

According to embodiments, the head portion 300 of the roller assembly 120A is assembled by connecting the support 318 to the bracket 324 using the fastening assembly 338 and then inserting the first protrusion 362 of the support 320 into the second hole 340 of the support 318. The roller 304C may then be assembled on the support 320 by sliding the roller 304C over the support 320 such that the support 320 engages the interior cavity of the roller 304C. Once the roller 304C is positioned over the support 320, the support 322 may be connected to the support 320 by inserting the second protrusion 364 of the support 320 into the second hole (not shown) of the support 322. The support 322 can then be affixed to the bracket 324 using the fastening assembly 354. Once the supports 318 and 322 are interlocked with the support 320 and connected to the bracket 324, the roller 304D may be assembled on the support 318 by sliding the roller 304D over the support 318 such that the support 318 engages the interior cavity of the roller 304D. Similarly, the roller 304B may be assembled on the support 322 by sliding the roller 304B over the support 322 such that the support 322 engages the interior cavity of the roller 304B.

After assembling the rollers 304B, 304C, and 304D on the supports 322, 320, and 318, respectively, the support 316 is connected to the supports 318 and 322. According to some embodiments, the first tab 370 of the support 316 is inserted within the groove 330 of the support 318, and the fastener 378 is then inserted through the first hole 332 of the support 318 and the hole 372 of the first tab 370 of the support 316 to connect the supports 316 and 318 together in a hinged configuration that allows the support 316 to rotate about the fastener 378. The roller 304A can then be assembled on the support 316 by sliding the roller 304A over the support 316 such that the support 316 engages the interior cavity of the roller 304A. In some embodiments, the support 316 includes a stop 382, as shown in FIG. 3A, extending outward from the surface of the support 316 and positioned at the second end 368 of the support 316 to retain the roller 304A on the support 316 when the roller assembly 120A is placed in the open configuration. Non-limiting examples of the stop include a screw, bolt, and rivet.

The second tab 374 of the support 316 can then be locked within the groove 346 of the support 322 by putting the pin assembly 380 in an engaged position, which places the roller assembly 120A in the closed configuration such that conductors being pulled from a source to a destination can be maintained within the roller assembly 120A. To easily load conductors into the roller assembly 120A or remove conductors from the roller assembly 120A, the roller assembly 120A can be placed in the open configuration by putting the pin assembly 380 in a retracted position and rotating the support 316 and roller 304A upward about the fastener 378 to remove the second tab 374 of the support 316 from the groove 346 of the support 322.

Figure 3E:
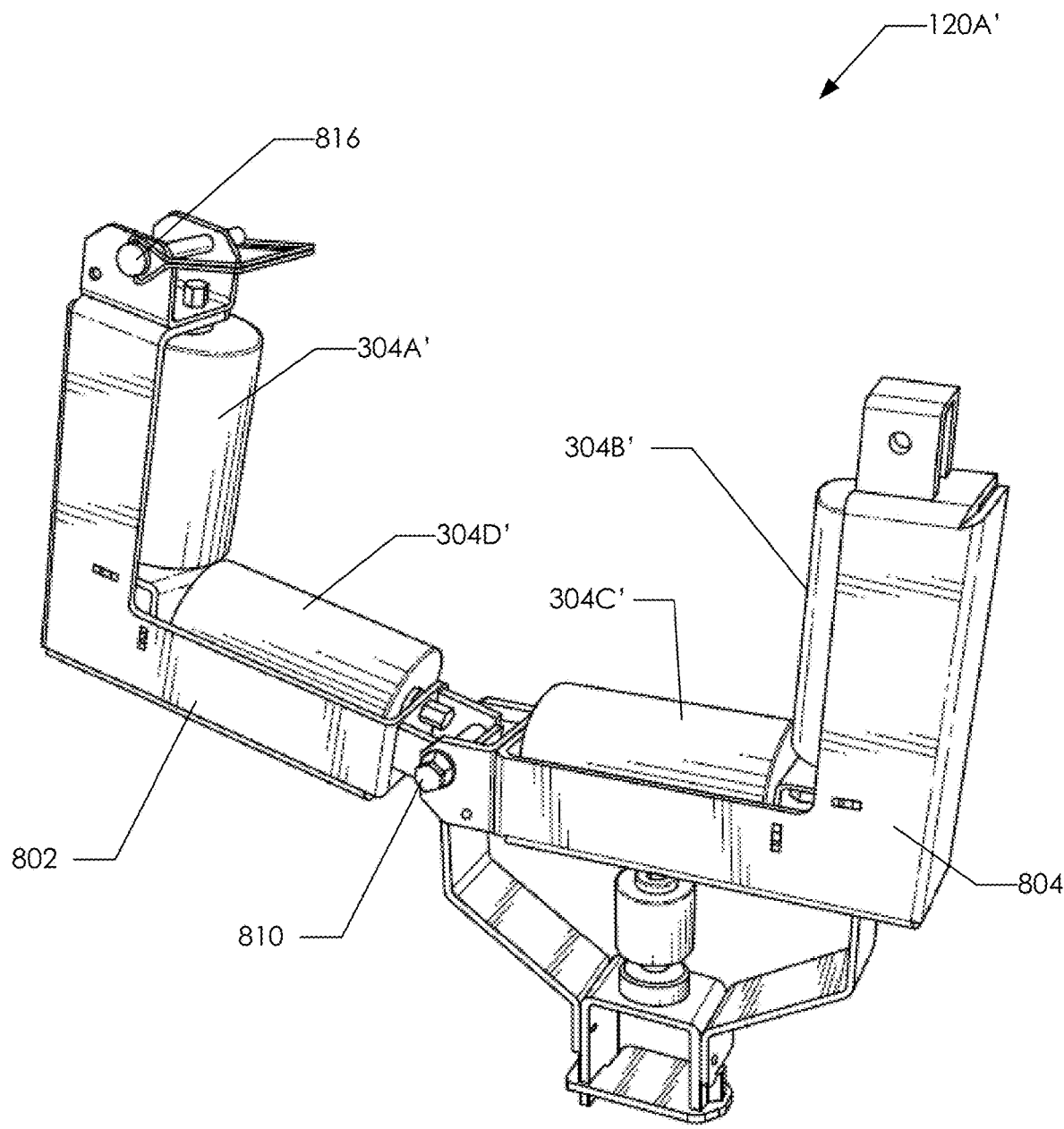

Considering the alternative embodiment illustrated in FIGS. 3C-3E, the rollers 304A' and 304D' are retained within a first L-shaped bracket 802 via a support 316' and a support 318', respectively, and the rollers 304B' and 304C' are retained within a second L-shaped bracket 804 via a support 322' and a support 320', respectively. According to some embodiments, a first end 806 of the first L-shaped bracket 802 interlocks with a first end 808 of the second L-shaped bracket 804 and is attached, in a hinged configuration, to the first end 808 of the second L-shaped bracket 804 via a fastener 810 to allow the first L-shaped bracket 802 to rotate relative the second L-shaped bracket 804 to place the roller assembly 120A' in an open configuration to easily load and/or remove conductors from the roller assembly 120A', as illustrated in FIG. 3E. A second end 812 of the second L-shaped bracket 804 may be interlocked with a second end 814 of the first L-shaped bracket 802, and a pin assembly 816 may then be used to selectively lock the second end 812 of the second L-shaped bracket 804 and the second end 814 of the first L-shaped bracket 802 together. The pin assembly 816 may include a retractable pin or plunger allowing the first L-shaped bracket 802 and the second L-shaped bracket 804 to be selectively locked and unlocked relative to one another. Non-limiting examples of the pin assembly 816 include spring-loaded pull pins, indexing plungers, and quick release pins.

To attach the roller assembly 120A to the first base section 102A and elevate the head portion 300 above the first base section 102A, the head portion 300 of the roller assembly 120A is connected to the mount portion 302, as shown in FIG. 3A. According to embodiments, the mount portion 302 of the roller assembly 120A includes a shaft 384 and a foot 386. The shaft 384 has a first end 388 and a second end 390 spaced apart from and opposite the first end 388. According to embodiments, the first end 388 of the shaft 384 is connected to the bracket 324 of the head portion 300, and the second end 390 of the shaft 384 is connected to the foot 386. The first and second ends 388 and 389 of the shaft 384 may be connected to the bracket 324 and the foot 386, respectively, via fasteners such as screws, bolts, or nails. Alternatively, the first and second ends 388 and 389 of the shaft 384 may be welded to the bracket 324 and the foot 386, respectively. The cross section of the shaft 384 may be circular or may take other shapes such as, for example, rectangle, triangle, flat oval, hexagon, or irregular. Considering FIGS. 1 and 2A-2B, the shaft 384 works to space apart the head portion 300 of the roller assembly 120A from the foot 386 and, when the roller assembly 120A is attached to the first base section 102A, elevates the head portion 300 over the first base section 102A such that conductors maintained within the head portion 300 are held off the first base section 102A as well as the floor, ground, or other surface on which the first base section 102A rests.

Turning back to FIG. 3A, the foot 386 of the mount portion 302 includes a first side 392, a second side 394 opposite the first side 392, and a top 396. The shaft 384 may be connected to the top 396 of the foot 386. According to embodiments, the first side 392, the second side 394, and the top 396 of the foot 386 form a channel 398 that receives the first base section 102A when the roller assembly 120A is mounted on the first base section 102A. The foot 386 may further include a pin assembly 399 for securing the roller assembly 120A to the first base section 102A. The pin assembly 399 comprises a retractable stop member, such as a pin or plunger, that extends through one of the plurality of holes 112A-112N or one of the plurality of corresponding holes of the first tubular member 104, through one of the plurality of holes 110A-110N or one of the plurality of corresponding holes of the third tubular member 108, and/or through one of the plurality of holes 114A-114N or one of the plurality of corresponding holes of the second tubular member 106, when the roller assembly 120A is mounted on the first base section 102A and the pin assembly 399 is placed in an engaged position. To disengage the pin assembly 399, the pin assembly 399 is placed in a retracted position by pulling a handle or ring of the pin assembly 399 back to retract the stop member from a hole of the first base section 102A aligned with the pin assembly 399.

According to embodiments, to attach the roller assembly 120A to the first base section 102A, the handle or ring of the pin assembly 399 is pulled back to place the pin assembly 399 in the retracted position while the roller assembly 120A is mounted over the first base section 102A and positioned on the first base section 102A to align the pin assembly 399 with one of the plurality of holes 112A-112N or one of the plurality of corresponding holes of the first tubular member 104, one of the plurality of holes 110A-110N or one of the plurality of corresponding holes of the third tubular member 108, and/or one of the plurality of holes 114A-114N or one of the plurality of corresponding holes of the second tubular member 106. The ring or handle of the pin assembly 399 is then released to place the pin assembly 399 in the engaged position to allow the pin or plunger of the pin assembly 399 to engage the aligned hole of the first base section 102A. While the roller assembly 120A is mounted on the first base section 102A, the roller assembly 120A can be quickly and easily repositioned along the first base section 102A by placing the pin assembly 399 in the retracted position and sliding the roller assembly 120A along the first base section 102A until the pin assembly 399 aligns with and engages another of the plurality of holes 112A-112N or another of the plurality of corresponding holes of the first tubular member 104, another of the plurality of holes 110A-110N or another of the plurality of corresponding holes of the third tubular member 108, or another of the plurality of holes 114A-114N or another of the plurality of corresponding holes of the second tubular member 106. According to embodiments, the foot 386 may include two pin assemblies 399 for engaging one of the plurality of holes 112A-112N and one of the plurality of corresponding holes of the first tubular member 104, one of the plurality of holes 110A-110N and one of the plurality of corresponding holes of the third tubular member 108, or one of the plurality of holes 114A-114N and one of the plurality of corresponding holes of the second tubular member 106.

As shown in FIG. 1, the joint 118 is attached to a base section, such as the first base section 102A, and another base section, such as the second base section 102B, to connect the first and second base sections 102A, 102B together in series. Although the following describes the joint 118 as being used to connect base sections, such as the first and second base sections 102A, 102B, in series, it should be understood that the joint 118 can also be used to connect a base section and another element, such as a feeder attachment 700, in series, as will be described with reference to FIGS. 7A-7B, or to connect other elements in series. The joint 118 allows the conductor guide system 100 to be configured in a plurality of arrangements to accommodate the topography, including bends, corners, elevations, and depressions, of the route from a source to a destination that one or more conductors travel.

Figure 4A:
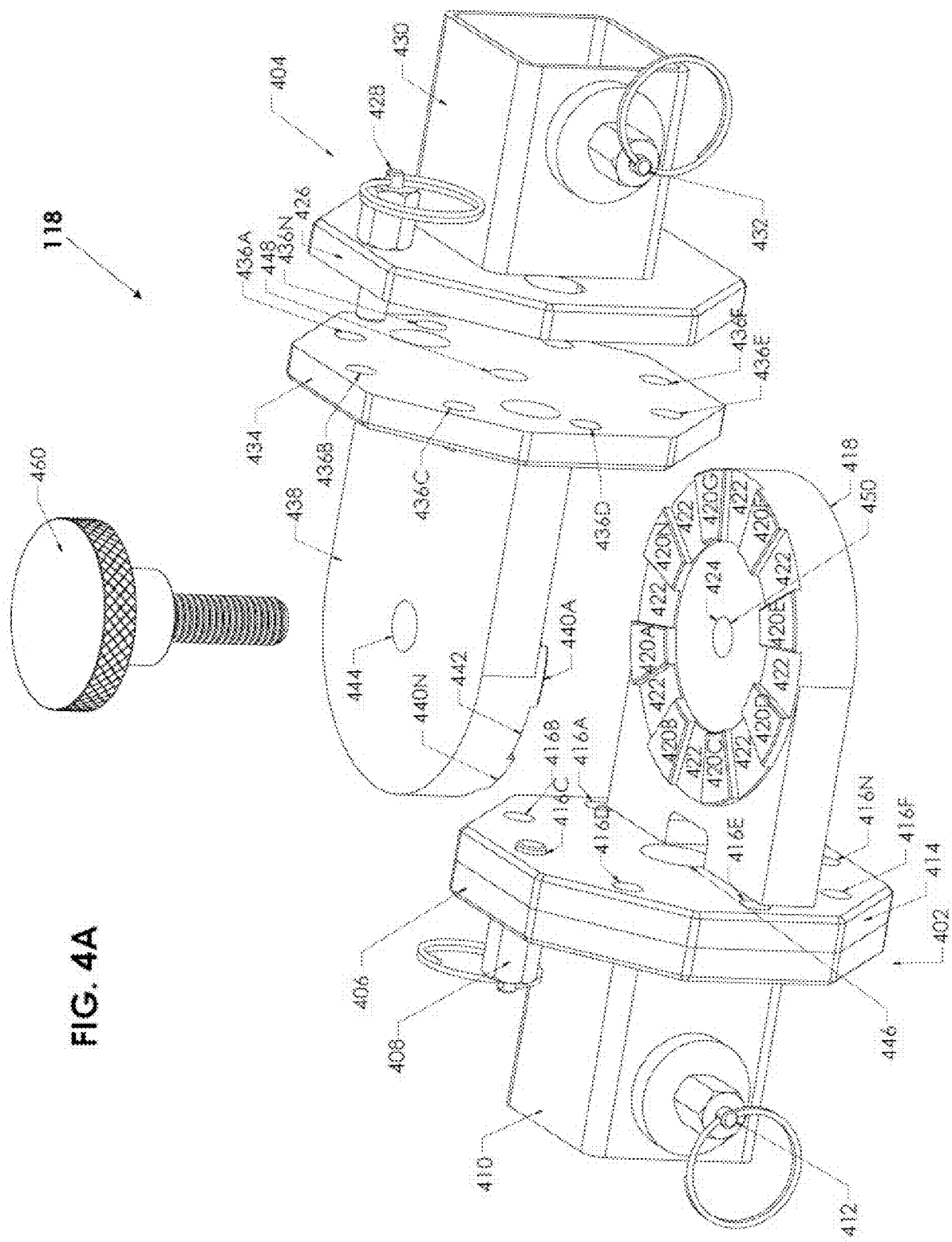
FIG. 4A is a perspective view of a joint of the conductor guide system, according to an illustrative embodiment.

Turning now to FIGS. 4A-4B and 5A-5F, the joint 118 will be described in detail in accordance with an illustrative embodiment. Considering FIG. 4A first, the joint 118 includes a first connector 402 and a second connector 404. According to embodiments, the first connector 402 has a two-piece construction including, in a first piece, an outside plate 406 and a post 410 extending outward from an exterior surface of the outside plate 406 for connecting the joint 118 to a base section, such as the first base section 102A, and including, in a second piece, an inside plate 414 and a mating portion 418 extending outward from an interior surface of the inside plate 414 for coupling the first connector 402 with the second connector 404. As shown in FIG. 4A and according to embodiments, the post 410 is a tube having a pin assembly 412, similar to the pin assemblies 116A-116B of the first base section 102A described above, including a retractable stop member, such as a pin or plunger, that extends through an opening in a first side of the post 410 and into a hole aligned with the pin assembly 412 to engage whatever is associated with the hole, when the pin assembly 412 is placed in an engaged position. The post 410 may also have a corresponding hole (not shown), that aligns with the pin assembly 412, passing through a second side of the post 410 opposing the first side. To connect the post 410 with a base section, such as the first base section 102A, the post 410 may be sized to receive the first base section 102A within the post 410. When the first base section 102A is inserted within the post 410, the pin assembly 412 can be placed in a retracted position and aligned with a hole, such as the hole 114N of the second tubular member 106, of the first base section 102A. The pin assembly 412 can then be placed back in an engaged position such that the pin or plunger of the pin assembly 412 engages the hole 114N of the second tubular member 106 of the first base section 102A to lock the first connector 402 of the joint 118, and ultimately the entire joint 118, and the first base section 102A together. Alternatively, the post 410 may be sized to allow the post 410 to be inserted within an end of the first base section 102A, and the second tubular member 106, instead of the post 410, may include a pin assembly for engaging a hole of the post 410. Although the post 410 is shown having a square cross section, the cross section of the post 410 may have another shape such as, for example, a circle, hexagon, octagon, or other polygon as long as the shape of the cross section of the post 410 corresponds with the element with which the post 410 is connected such that the element can be inserted within the post 410 or the post 410 can be inserted within the element.

According to embodiments, the outside plate 406 of the first connector 402 is connected to the inside plate 414 of the first connector 402 by a connection element (not shown), such as for example a pin or rod, that allows the first piece of the first connector 402, namely the outside plate 406 and the post 410, to remain attached to the second piece of the first connector 402, namely the inside plate 414 and the mating portion 418, yet rotate freely about a first pivot point 446 relative to the second piece of the first connector 402 and also allows the second piece of the first connector 402 to rotate freely about the first pivot point 446 relative to the first piece of the first connector 402. The outside plate 406, according to embodiments, includes a pin assembly 408, similar to the other pin assemblies described herein, positioned proximate an outside edge of the outside plate 406. When placed in a retracted position, the pin assembly 408 allows the first piece of the first connector 402 and the second piece of the first connector 402 to be rotated about the first pivot point 446 relative to one another. The inside plate 414 comprises a plurality of holes 416A-416N, each of which can be engaged by a pin or plunger of the pin assembly 408 of the outside plate 406, when the pin assembly 408 is placed in a retracted position, to lock the outside plate 406 and the inside plate 414 together to prevent the first piece of the first connector 402 from rotating about the first pivot point 446 relative to the second piece of the first connector 402 and, similarly, to prevent the second piece of the first connector 402 from rotating about the first pivot point 446 relative to the first piece of the first connector 402. The plurality of holes 416A-416N of the inside plate 414 may be arranged to form a radial array around an outside edge of the inside plate 414. According to embodiments, the shape of the cross section of each of the outside plate 406 and the inside plate 414 is a hexagon. However, the shape of the cross section of each of the outside plate 406 and the inside plate 414 may also be a square, pentagon, hexagon, heptagon, or other polygon.

Considering FIG. 4A further, the mating portion 418 of the first connector 402, according to embodiments, extends outward from below the center of the interior surface of the inside plate 414 and includes a plurality of raised portions 420A-420N extending outward from an interior surface of the mating portion 418. The mating portion 418 also includes an opening 424 extending through the mating portion 418. The opening 424 may be threaded for receiving a threaded fastener 460, as discussed further below. The plurality of raised portions 420A-420N may be arranged to form a radial array around the opening 424 or may be arranged to form another pattern around the opening 424. According to some embodiments, the interior surface of the mating portion 418 does not include the plurality of raised portions 420A-420N and, instead, has a substantially smooth profile. As discussed further below, the mating portion 418 can be coupled with the second connector 404 to connect the first connector 402 and the second connector 404 together.

According to embodiments, like the first connector 402, the second connector 404 has a two-piece construction including, in a first piece, an outside plate 426 and a post 430 extending outward from an exterior surface of the outside plate 426 for connecting the joint 118 to a base section, such as the second base section 102B, and including, in a second piece, an inside plate 434 and a mating portion 438 extending outward from an interior surface of the inside plate 434 for coupling the second connector 404 with the first connector 402. As shown in FIG. 4A and according to embodiments, the post 430 is a tube having a pin assembly 432, similar to the pin assemblies 116A-116B of the first base section 102A described above, including a retractable stop member, such as a pin or plunger, that extends through an opening in a first side of the post 430 and into a hole aligned with the pin assembly 432 to engage whatever is associated with the hole, when the pin assembly 432 is placed in an engaged position. The post 430 may also have a corresponding hole (not shown), that aligns with the pin assembly 432, passing through a second side of the post 430 opposing the first side. To connect the post 430 with a base section, such as the second base section 102B, the post 430 may be sized to receive the second base section 102B within the post 430. When the second base section 102B is inserted within the post 430, the pin assembly 432 can be placed in a retracted position to align a hole of the second base section 102B with the pin assembly 432 of the post 430, which is then placed back in an engaged position such that the pin or plunger of the pin assembly 432 engages the hole of the second base section 102B to lock the second connector 404 of the joint 118, and ultimately the entire joint 118, and the second base section 102B together. Alternatively, the post 430 is sized to be inserted within an end of the second base section 102B, and the second base section 102B, instead of the post 430, may include a pin assembly for engaging a hole of the post 430. Although the post 430 is shown having a square cross section, the cross section of the post 430 may have another shape such as, for example, a circle, hexagon, octagon, or other polygon as long as the shape of the cross section of the post 430 corresponds with the element with which the post 430 is mated such that the element can be inserted within the post 430 or the post 430 can be inserted within the element.

According to embodiments, the outside plate 426 of the second connector 404 is connected to the inside plate 434 of the second connector 404 by a connection element (not shown), such as for example a pin or a rod, that allows the first piece of the second connector 404, namely the outside plate 426 and the post 430, to remain attached to the second piece of the second connector 404, namely the inside plate 434 and the mating portion 438, yet rotate freely about a second pivot point 448 relative to the second piece of the second connector 404 and also allows the second piece of the second connector 404 to rotate freely about the second pivot point 448 relative to the first piece of the second connector 404. The outside plate 426, according to embodiments, includes a pin assembly 428, similar to the other pin assemblies described herein, positioned proximate an outside edge of the outside plate 426. When placed in a retracted position, the pin assembly 428 allows the first piece of the second connector 404 and the second piece of the second connector 404 to be rotated about the second pivot point 448 relative to one another. The inside plate 434 comprises a plurality of holes 436A-436N, each of which can be engaged by a pin or plunger of the pin assembly 428 of the outside plate 426, when the pin assembly 428 is placed in a retracted position, to lock the outside plate 426 and the inside plate 434 together to prevent the first piece of the second connector 404 from rotating about the second pivot point 448 relative to the second piece of the second connector 404 and, similarly, to prevent the second piece of the second connector 404 from rotating about the second pivot point 448 relative to the first piece of the second connector 404. The plurality of holes 436A-436N of the inside plate 434 may be arranged to form a radial array around an outside edge of the inside plate 434. According to embodiments, the shape of the cross section of each of the outside plate 426 and the inside plate 434 is a hexagon. However, the shape of the cross section of each of the outside plate 426 and the inside plate 434 may also be a square, pentagon, hexagon, heptagon, or other polygon.

Considering FIG. 4A further, the mating portion 438 of the second connector 404, according to embodiments, extends outward from above the center of the interior surface of the inside plate 434 and includes a plurality of raised portions 440A-440N, like the plurality of raised portions 420A-420N of the mating portion 418, extending outward from an interior surface of the mating portion 438. The mating portion 438 also includes an opening 444 extending through the mating portion 438. Like the opening 424 of the mating portion 418, the opening 444 of the mating portion 438 may be threaded to receive the threaded fastener 460, as described further below. The plurality of raised portions 440A-440N may be arranged to form a radial array around the opening 444 or may be arranged to form another pattern around the opening 444. According to some embodiments, the interior surface of the mating portion 438 does not include the plurality of raised portions 440A-440N and, instead, has a substantially smooth profile.

Considering FIGS. 4A and 5A and according to embodiments, the first connector 402 and the second connector 404 are assembled together by coupling the mating portion 418 of the first connector 402 with the mating portion 438 of the second connector 404 so that the plurality of raised portions 420A-420N of the mating portion 418 is received within a plurality of spaces 442 between the plurality of raised portions 440A-440N of the mating portion 438, the plurality of raised portions 440A-440N of the mating portion 438 is received within a plurality of spaces 422 between the plurality of raised portions 420A-420N of the mating portion 418, and the opening 424 of the mating portion 418 is aligned with the opening 444 of the mating portion 438. According to embodiments, the threaded fastener 460, which may be a screw or a bolt, is screwed into the opening 424 of the mating portion 418 and the opening 444 of the mating portion 438 to connect the first connector 402 and the second connector 404 together to form the joint 118. When the threaded fastener 460 is screwed into the openings 424, 444, and tightened, the plurality of raised portions 420A-420N of the mating portion 418 is locked within the plurality of spaces 442 between the plurality of raised portions 440A-440N of the mating portion 438, and the plurality of raised portions 440A-440N of the mating portion 438 is locked within the plurality of spaces 422 between the plurality of raised portions 420A-420N of the mating portion 418. When the threaded fastener 460 is screwed into the openings 424, 444, but not tightened so as to lock the plurality of raised portions 420A-420N of the mating portion 418 within the plurality of spaces 442 between the plurality of raised portions 440A-440N of the mating portion 438 and the plurality of raised portions 440A-440N of the mating portion 438 within the plurality of spaces 422 between the plurality of raised portions 420A-420N of the mating portion 418, the first connector 402 is rotatable about a third pivot point 450 relative to the second connector 404, and the second connector 404 is rotatable about the third pivot point 450 relative to the first connector 402. When the threaded fastener 460 is not tightened, the plurality of raised portions 420A-420N of the mating portion 418 and the plurality of raised portions 440A-440N of the mating portion 438 can slide over one another as the first connector 402 and the second connector 404 are rotated about the third pivot point 450 relative to one another.

Figure 5E:
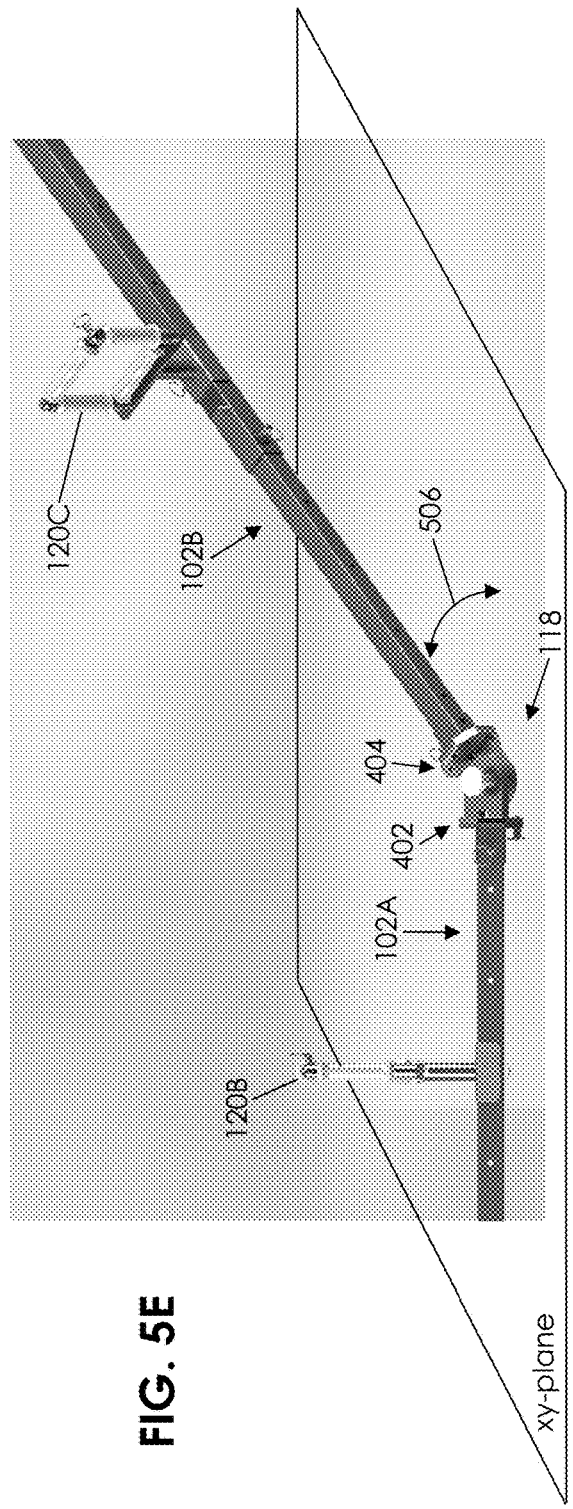

Turning now to FIGS. 5A-5G, the configurations achievable by the conductor guide system 100 based on the joint 118 described above with reference to FIG. 4A will be described in detail in accordance with an illustrative embodiment. FIGS. 5A-5B show a side view and a top view, respectively, of the joint 118 arranged in a linear configuration. In the linear configuration, the first connector 402 and the second connector 404 are rotated about the third pivot point 450 relative to one another such that an angle 500 between the first base section 102A and the second base section 102B is approximately 180 degrees, as shown in FIG. 5B. In the linear configuration, the vertical angle of the first base section 102A and the second base section 102B relative to a xy-plane indicated in FIG. 5A is 0 degrees. The linear configuration of the first base section 102A and the second base section 102B may be used on one or more portions of a route from a conductor source to a conductor destination that have a relatively straight, flat topography.

FIGS. 5C-5D show a side view and a top view, respectively, of the joint 118 arranged in an angled configuration. In the angled configuration, according to embodiments, the second connector 404 is rotated about the third pivot point 450 relative to the first connector 402 creating an angle 502 between the first base section 102A and the second base section 102B that is less than 180 degrees, as shown in FIG. 5D, or greater than 180 degrees. According to embodiments, the joint 118 allows base sections, such as the first and second base sections 102A, 102B, to be rotated about the third pivot point 450 relative to one another to achieve angles between the first and second base sections 102A, 102B of approximately 90 degrees to approximately 270 degrees at increments based on the width of the widest portion of each of the plurality of raised portions 420A-420N and 440A-440N of the first and second connectors 402, 404, respectively. In the angled configuration, the vertical angle of the first base section 102A and the second base section 102B relative to an xy-plane, shown in FIG. 5C, is 0 degrees. The angled configuration of the first base section 102A and the second base section 102B may be used on one or more portions of a route from a conductor source to a conductor destination that has a relatively flat topography but that has corners and bends that need to be maneuvered.

Figure 5F:
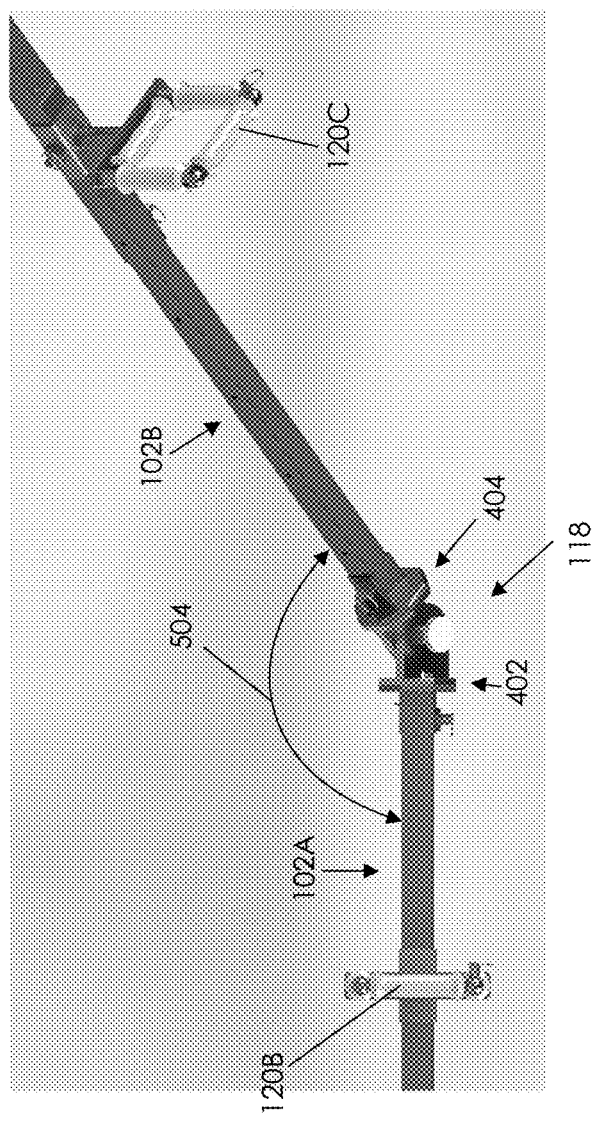
Figure 5G:
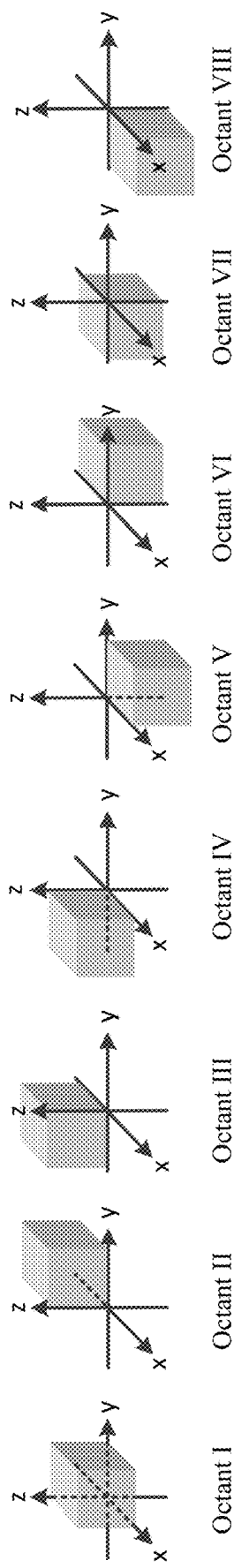
FIG. 5G provides a visual of the eight octants created by the intersection of the x-axis, y-axis, and z-axis.

FIGS. 5E-5F show a side view and a top view, respectively, of the joint 118 arranged in a compound angled configuration. In the compound angled configuration, according to embodiments, the second connector 404 is rotated about the third pivot point 450 relative to the first connector 402 creating an angle 504 between the first base section 102A and the second base section 102B that can be less than 180 degrees, as seen in FIG. 5F, or can be greater than 180 degrees, and the second piece of the first connector 402, namely the inside plate 414 and the mating portion 418, is rotated about the first pivot point 446 relative to the first piece of the first connector 402, namely the outside plate 406 and the post 410, causing the second base section 102B to have either an angle of elevation 506 relative to an xy-plane, as shown in FIG. 5E, or an angle of depression relative to the xy-plane. The second piece of the second connector 404, namely the inside plate 434 and the mating portion 438, can also be rotated about the second pivot point 448 relative to the first piece of the second connector 404, namely the outside plate 426 and the post 430, causing the first base section 102A to have either an angle of elevation or an angle of depression relative to the xy-plane. Thus, the joint 118 allows base sections, such as the first and second base sections 102A and 102B, to each be rotated about each of the first pivot point 446, the second pivot point 448, and the third pivot point 450 to cause one or both of the first and second base sections 102A and 102B to have angles of elevation or depression relative to the xy-plane; to allow the angles of elevation or depression relative to the xy-plane of one or both of the first and second base sections 102A and 102B to be varied; and to allow the angle between the first base section 102A and the second base section 102B to be varied. Thus, according to embodiments, the joint 118 allows the first base section 102A to be configured to extend variously into the three-dimensional space defined by the octants III, IV, VII, and VIII created by the intersection of the x-axis, y-axis, and z-axis, as shown in FIG. 5G, and allows the second base section 102B to be configured to extend variously into the three-dimensional space defined by the octants I, II, V, and VI created by the intersection of the x-axis, y-axis, and z-axis, as also shown in FIG. 5G. The compound angled configuration of the first base section 102A and the second base section 102B may be used on one or more portions of a route from a conductor source to a conductor destination that have inclines and depressions, such as stairs and walls, that must be traversed as well as bends and corners that must be maneuvered.

Figure 4B:
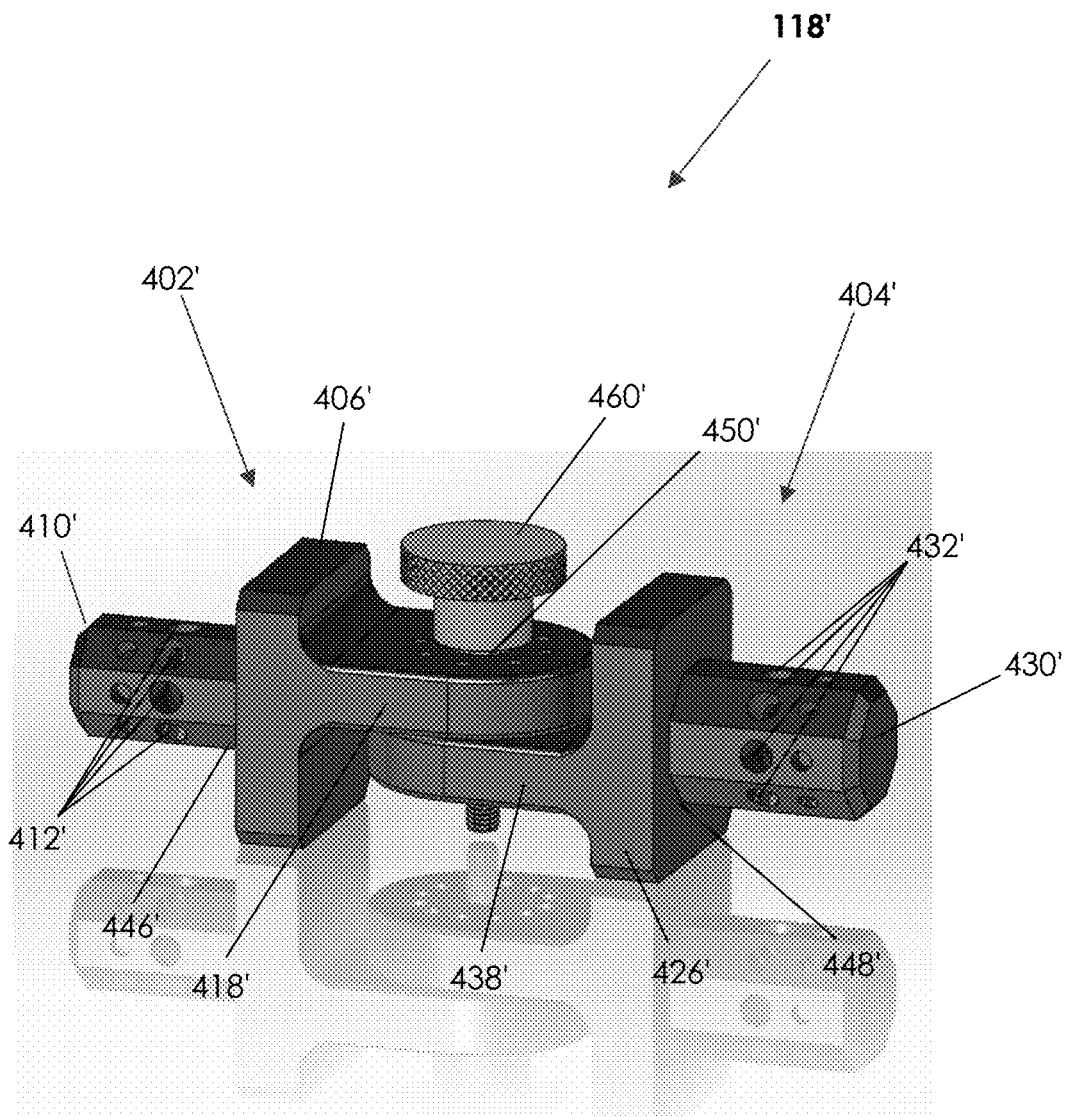
FIG. 4B is a perspective view of an alternative joint of the conductor guide system, according to an illustrative embodiment.

Turning to FIG. 4B, in an alternative embodiment from the embodiment described above where the first connector 402 and the second connector 404 of the joint 118 are each two-piece constructions, a joint 118' is described having a first connector 402' and a second connector 404', each having a single-piece construction. The first connector 402' includes a plate 406'; a post 410' extending outward from an exterior surface of the plate 406' for connecting the joint 118' to a base section, such as the first base section 102A; and a mating portion 418' extending outward from an interior surface of the plate 406' for coupling the first connector 402' with the second connector 404'. As shown in FIG. 4B and according to embodiments, the post 410' has a plurality of blind holes 412' extending through a portion of the post 410'. According to embodiments, each side of the post 410' has one of the plurality of blind holes 412' extending therethrough. To connect the post 410' with a base section, such as the first base section 102A, the post 410' may be sized to allow the post 410' to be inserted within an end of the first base section 102A. When the post 410' is inserted within the end of the first base section 102A, a pin assembly of the first base section 102A can be placed in a retracted position to allow the post 410' to be positioned such that one of the plurality blind holes 412' of the post 410' aligns with the pin assembly of the first base section 102A. The pin assembly of the first base section 102A can then be placed back in an engaged position such that the pin or plunger of the pin assembly engages the blind hole 412' of the post 410' to lock the first connector 402' of the joint 118' and the first base section 102A together. According to embodiments, the shape of the cross section of the post 410' is a hexagon and the resulting number of the plurality of blind holes 412' of the post 410' is eight. It is appreciated that the shape of the cross section of the post 410' may be another shape such as, for example, a square, pentagon, or other polygon shape, and the number of the plurality of blind holes 412' may depend on the number of sides of the shape. Alternatively, the cross section of the post 410' may be a circle, and the number of the plurality of blind holes 412' of the post 410' may depend on the circumference of the post 410'.

As discussed above, the post 410' of the first connector 402' can be inserted within the end of the first base section 102A to connect the first connector 402' to the first base section 102A. When the first connector 402' and the first base section 102A are connected and a pin assembly of the first base section 102A is in a retracted position, the post 410' of the first connector 402' can be rotated within the first base section 102A, or pulled out from within the first base section 102A, rotated, and then inserted back in the first base section 102A, causing the first connector 402' to rotate about a first pivot point 446' relative to the first base section 102A, and the first base section 102A can be rotated about the first pivot point 446' relative to the first connector 402'. The pin assembly of the first base section 102A, when aligned with one of the blind holes 412' of the first connector 402' and placed in the engaged position, locks the first base section 102A and the first connector 402' together to prevent the first base section 102A from rotating about the first pivot point 446' relative to the first connector 402' and, similarly, to prevent the first connector 402' from rotating about the first pivot point 446' relative to the first base section 102A.

Considering FIG. 4B further, the mating portion 418' of the first connector 402', according to embodiments, extends outward from below the center of the interior surface of the plate 406'. According to some embodiments, an interior surface of the mating portion 418' has a substantially smooth profile. Alternatively, the mating portion 418' may include a plurality of raised portions (not shown), similar to the plurality of raised portions 420A-420N of the joint 118, extending outward from the interior surface of the mating portion 418'. The mating portion 418' also includes an opening (not shown), similar to the opening 424 of the joint 118, extending through the mating portion 418. The opening may be threaded for receiving a threaded fastener 460', as discussed further below. The plurality of raised portions may be arranged to form a radial array around the opening, similar to the plurality of raised portions 420A-420N of the joint 118, or may be arranged to form another pattern around the opening. As discussed further below, the mating portion 418' can be coupled with the second connector 404' to connect the first connector 402' and the second connector 404' together.

According to embodiments, like the first connector 402', the second connector 404' has a plate 426'; a post 430' extending outward from an exterior surface of the plate 426' for connecting the joint 118' to a base section, such as the second base section 102B; and a mating portion 438' extending outward from an interior surface of the plate 426' for coupling the second connector 404' with the first connector 402'. As shown in FIG. 4B and according to embodiments, the post 430' has a plurality of blind holes 432' extending through a portion of the post 430'. According to embodiments, each side of the post 430' has one of the plurality of blind holes 432' extending therethrough. To connect the post 430' with a base section, such as the second base section 102B, the post 430' may be sized to allow the post 430' to be inserted within an end of the second base section 102B. When the post 430' is inserted within the end of the second base section 102B, a pin assembly of second base section 102B can be placed in a retracted position to allow the post 430' to be positioned such that one of the plurality of blind holes 432' of the post 430' aligns with the pin assembly of the second base section 102B. The pin assembly of the second base section 102B can then be placed back in an engaged position such that the pin or plunger of the pin assembly engages the blind hole 432' of the post 430' to lock the second connector 404' of the joint 118' and the second base section 102B together. According to embodiments, the shape of the cross section of the post 430' is a hexagon and the resulting number of the plurality of blind holes 432' of the post 430' is eight. It is appreciated that the shape of the cross section of the post 430' may be another shape such as, for example, a square, pentagon, or other polygon shape, and the number of the plurality of blind holes 432' may depend on the number of sides of the shape. Alternatively, the cross section of the post 430' may be a circle, and number of the plurality of blind holes 432' of the post 430' may depend on the circumference of the post 430'.

As discussed above, the post 430' of the second connector 404' can be inserted within the end of the second base section 102B to connect the second connector 404' to the second base section 102B. When the second connector 404' and the second base section 102B are connected and the pin assembly of the second base section 102B is in a retracted position, the post 430' of the second connector 404' can be rotated within the second base section 102B, or pulled out from within the second base section 102B, rotated, and then inserted back in the second base section 102B, causing the second connector 404' to rotate about a second pivot point 448' relative to the second base section 102B, and the second base section 102B can be rotated about the second pivot point 448' relative to the second connector 404'. The pin assembly of the second base section 102B, when aligned with one of the blind holes 432' of the second connector 404' and placed in the engaged position, locks the second base section 102B and the second connector 404' together to prevent the second base section 102B from rotating about the second pivot point 448' relative to the second connector 404' and, similarly, to prevent the second connector 404' from rotating about the second pivot point 448' relative to the second base section 102B.

Considering FIG. 4B further, the mating portion 438' of the second connector 404', according to embodiments, extends outward from above the center of the interior surface of the plate 426'. According to embodiments, an interior surface of the mating portion 438' has a substantially smooth profile. Alternatively, the mating portion 438' includes a plurality of raised portions, similar to the plurality of raised portions 440A-440N of the joint 118, extending outward from an interior surface of the mating portion 438'. The mating portion 438' also includes an opening, similar to the opening 444 of the joint 118, extending through the mating portion 438'. The opening of the mating portion 438' may be threaded to receive the threaded fastener 460', as described further below. The plurality of raised portions, like the plurality of raised portions 440A-440N of the joint 118, may be arranged to form a radial array around the opening or may be arranged to form another pattern around the opening. According to some embodiments, the interior surface of the mating portion 438' does not include the plurality of raised portions and, instead, has a substantially smooth profile.

As illustrated in FIG. 4B, the first connector 402' and the second connector 404' are assembled together by coupling the mating portion 418' of the first connector 402' with the mating portion 438' of the second connector 404' so that, according to embodiments, the plurality of raised portions of the mating portion 418' is received within a plurality of spaces between the plurality of raised portions of the mating portion 438', the plurality of raised portions of the mating portion 438' is received within a plurality of spaces between the plurality of raised portions of the mating portion 418', and the opening of the mating portion 418' is aligned with the opening of the mating portion 438'. According to embodiments, the threaded fastener 460', which may be a screw or a bolt, is screwed into the opening of the mating portion 418' and the opening of the mating portion 438' to connect the first connector 402' and the second connector 404' together to form the joint 118'. When the threaded fastener 460' is screwed into the openings, but not tightened so as to lock the plurality of raised portions of the mating portion 418' within the plurality of spaces between the plurality of raised portions of the mating portion 438' and the plurality of raised portions of the mating portion 438' within the plurality of spaces between the plurality of raised portions of the mating portion 418', the first connector 402' is rotatable about a third pivot point 450' relative to the second connector 404', and the second connector 404' is rotatable about the third pivot point 450' relative to the first connector 402'. When the threaded fastener 460' is not tightened, the plurality of raised portions of the mating portion 418' and the plurality of raised portions of the mating portion 438' are allowed to slide over one another as the first connector 402' and the second connector 404' are rotated about third pivot point 450' relative to one another.

It should be understood from the description set forth above that the joint 118', like the joint 118, allows the first and second base sections 102A and 102B to be placed in the linear, angled, and compound angled configurations described above with reference to FIGS. 5A-5F. Moreover, like the joint 118, the joint 118' allows base sections, such as the first and second base sections 102A, 102B, to each be rotated about each of the first pivot point 446', the second pivot point 448', and the third pivot point 450' to cause one or both of the first and second base sections 102A, 102B to have angles of elevation or depression relative to the xy-plane; to allow the angles of elevation or depression relative to the xy-plane of one or both of the first and second base sections 102A, 102B to be varied; and to allow the angle between the first base section 102A and the second base section 102B to be varied. Thus, according to embodiments, the joint 118' allows the first base section 102A to be configured to extend variously into the three-dimensional space defined by the octants III, IV, VII, and VIII created by the intersection of the x-axis, y-axis, and z-axis, as shown in FIG. 5G, and allows the second base section 102B to be configured to extend variously into the three-dimensional space defined by the octants I, II, V, and VI created by the intersection of the x-axis, y-axis, and z-axis, as also shown in FIG. 5G.

Figure 6A:
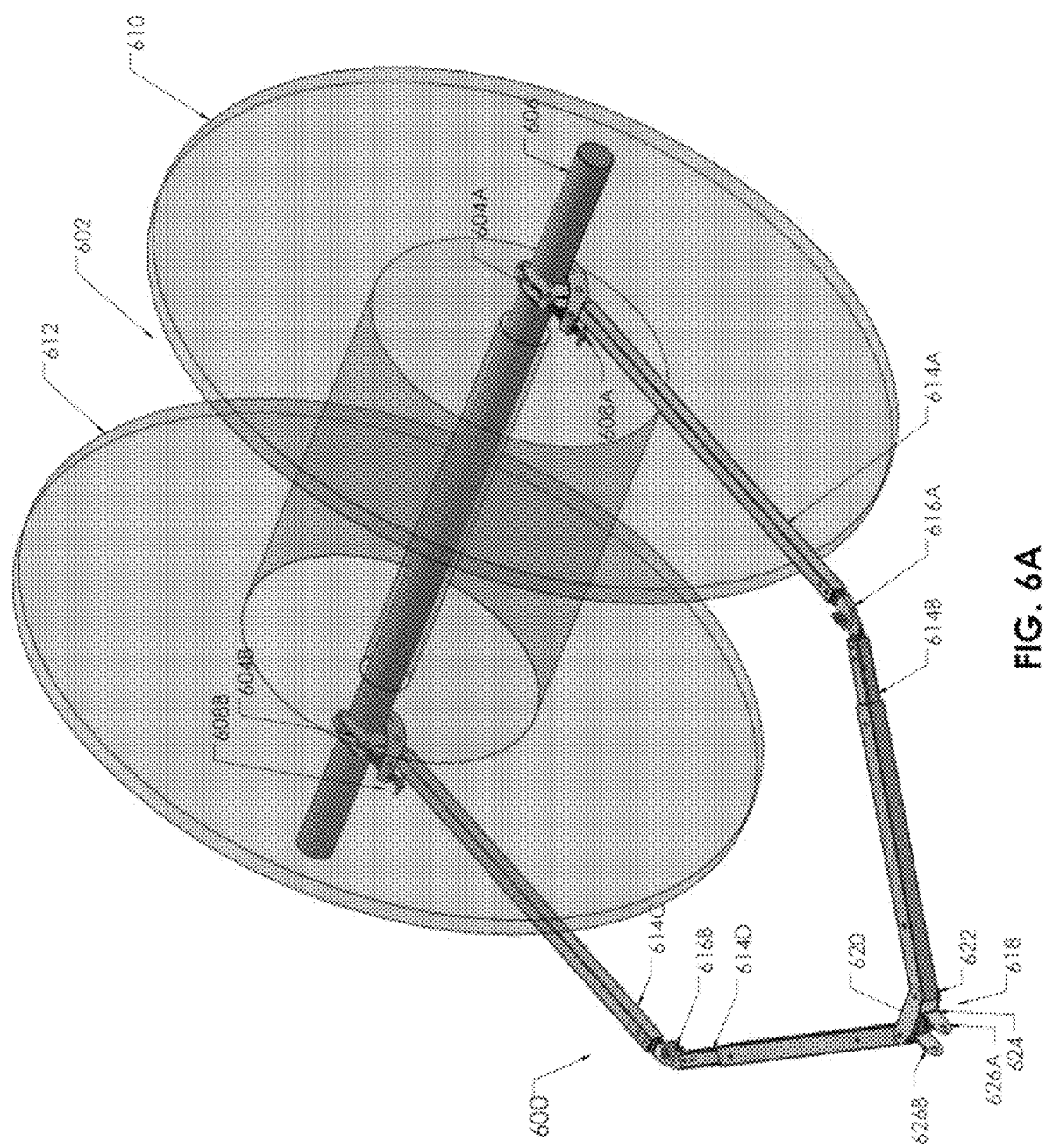

Turning now to FIGS. 6A-6B, a reel attachment 600 will be described in detail in accordance with an illustrative embodiment. The reel attachment 600 connects, at a first end, to a base section, such as the first base section 102A, and connects, at a second end, to a source of conductors, such as a conductor reel 602, to guide conductors from the conductor reel 602 to a first roller assembly, such as the roller assembly 120A, as the conductors are being paid off the conductor reel 602. According to embodiments, the reel attachment 600 includes a first jaw 604A and a second jaw 604B that grip an arbor tube 606 of the conductor reel 602 to connect the reel attachment 600 to the conductor reel 602. The first and second jaws 604A and 604B include, according to embodiments, a screw 608A and a screw 608B, respectively, for tightening the first and second jaws 604A and 604B, respectively, around the arbor tube 606 after the arbor tube 606 is inserted within the first and second jaws 604A and 604B to secure the reel attachment 600 to the conductor reel 602. According to some embodiments, the reel attachment 600 may, alternatively, comprise a first clamp and a second clamp for securing the reel attachment 600 to a first flange 610 and a second flange 612, respectively, of the conductor reel 602.

According to embodiments, the reel attachment 600 includes a first arm section 614A, a second arm section 614B, a third arm section 614C, and a fourth arm section 614D connected to form a V-shaped configuration when the reel attachment 600 is placed in an expanded configuration, which is illustrated in FIG. 6A. The first arm section 614A is connected, at a first end, to the first jaw 604A and connected, at a second end spaced apart from and opposite the first end, to a pivot connector 616A that connects the first arm section 614A with the second arm section 614B in series. The second arm section 614B is connected, at a first end, to the pivot connector 616A and, at a second end spaced apart from and opposite the first end, to a pin bracket 618. The third arm section 614C is connected, at a first end, to the second jaw 604B and connected, at a second end spaced apart from and opposite the first end, to a pivot connector 616B that connects the third arm section 614C with the fourth arm section 614D in series. The fourth arm section 614D is connected, at a first end, to the pivot connector 616B and, at a second end spaced apart from and opposite the first end, to the pin bracket 618.

The pivot connector 616A, according to embodiments, creates a first pivot point of the reel attachment 600 and allows the second arm section 614B to rotate about the pivot connector 616A relative to the first arm section 614A. Similarly, the pivot connector 616B, according to embodiments, creates a second pivot point of the reel attachment 600 and allows the fourth arm section 614D to rotate about the pivot connector 616B relative to the third arm section 614C. Rotation of the second arm section 614B about the pivot connector 616A and rotation of the fourth arm section 614D about the pivot connector 616B allow the reel attachment 600 to be moved from an expanded configuration, as shown in FIG. 6A, to a collapsed configuration, as shown in FIG. 6B and discussed further below.

According to embodiments, the second arm section 614B and the fourth arm section 614D each includes a first tubular member and a second tubular member having a size that will telescope, or slide, within the first tubular member, similar to the base sections of the conductor guide system 100 described above, to extend and retract the length of each of the second arm section 614B and the fourth arm section 614D. The second arm section 614B may include one or more holes passing through a top of the second arm section 614B and one or more corresponding holes passing through a bottom opposite the top of the second arm section 614B for use in connecting the second arm section 614B to the pin bracket 618. Similarly, the fourth arm section 614D may include one or more holes passing through a top of the fourth arm section 614D and one or more corresponding holes passing through a bottom opposite the top of the fourth arm section 614D for use in connecting the fourth arm section 614D to the pin bracket 618. The second and fourth arm sections 614B, 614D may also each include a pin assembly, similar to the pin assemblies described above, for locking the first tubular member of the second arm section 614B relative to the second tubular member of the second arm section 614B and for locking the first tubular member of the fourth arm section 614D relative to the second tubular member of the fourth arm section 614D.

According to embodiments, the pin bracket 618 includes a top 620, a bottom 622, and a side 624 that form a channel for receiving the second arm section 614B and the fourth arm section 614D. The top 620 may include a plurality of holes extending therethrough that align with a plurality of corresponding holes extending through the bottom 622. According to embodiments, once the second arm section 614B is positioned within the channel of the pin bracket 618 and a hole and corresponding hole of the second arm section 614B are aligned with a hole and a corresponding hole of the pin bracket 618, a fastener, such as a pin or rod, can be inserted through the holes to create a third pivot point of the reel attachment 600 that connects the second arm section 614B to the pin bracket 618 such that the pin bracket 618 is rotatable about the fastener relative to the second arm section 614B and the second arm section 614B is rotatable about the fastener relative to the pin bracket 618. Similarly, once the fourth arm section 614D is positioned within the channel of the pin bracket 618 and a hole and corresponding hole of the fourth arm section 614D are aligned with a hole and a corresponding hole of the pin bracket 618, a fastener, such as a pin or rod, can be inserted through the holes to create a fourth pivot point of the reel attachment 600 that connects the fourth arm section 614D to the pin bracket 618 such that the pin bracket 618 is rotatable about the fastener relative to the fourth arm section 614D and the fourth arm section 614D is rotatable about the fastener relative to the pin bracket 618.

The first, second, third and fourth pivot points of the reel attachment 600 allow the reel attachment 600 to be placed in the expanded configuration, as shown in FIG. 6A, when connecting a source, such as the conductor reel 602, to the conductor guide system 100, and also allows the reel attachment 600 to be placed in a collapsed configuration, as shown in FIG. 6B, while the reel attachment 600 is being transported. According to embodiments, the reel attachment 600 can be placed in the collapsed configuration shown in FIG. 6B by retracting the first tubular member of each of the second and fourth arm sections 614B, 614D within the second tubular member of each of the second and fourth arm sections 614B, 614D, respectively, and then rotating the second arm section 614B about both the first pivot point and the third pivot point to position the second arm section 614B along an interior side of the first arm section 614A and rotating the fourth arm section 614D about both the second pivot point and the fourth pivot point to position the fourth arm section 614D along an interior side of the third arm section 614C.

As shown in FIG. 6A, a first tab 626A and a second tab 626B extend outward from the side 624 of the pin bracket 618 for connecting the reel attachment 600 to a base section, such as the first base section 102A. The first and second tabs 626A and 626B include holes that can each be aligned with a hole and corresponding hole, respectively, of a base section of the conductor guide system 100 to receive a pin or rod therethrough to connect the reel attachment 600 to the conductor guide system 100. Alternatively, a pin assembly of a base section of the conductor guide system 100 may be used to engage the hole of one or both of the first and second tabs 626A, 626B to connect the reel attachment 600 to the conductor guide system 100.

Figure 7A:
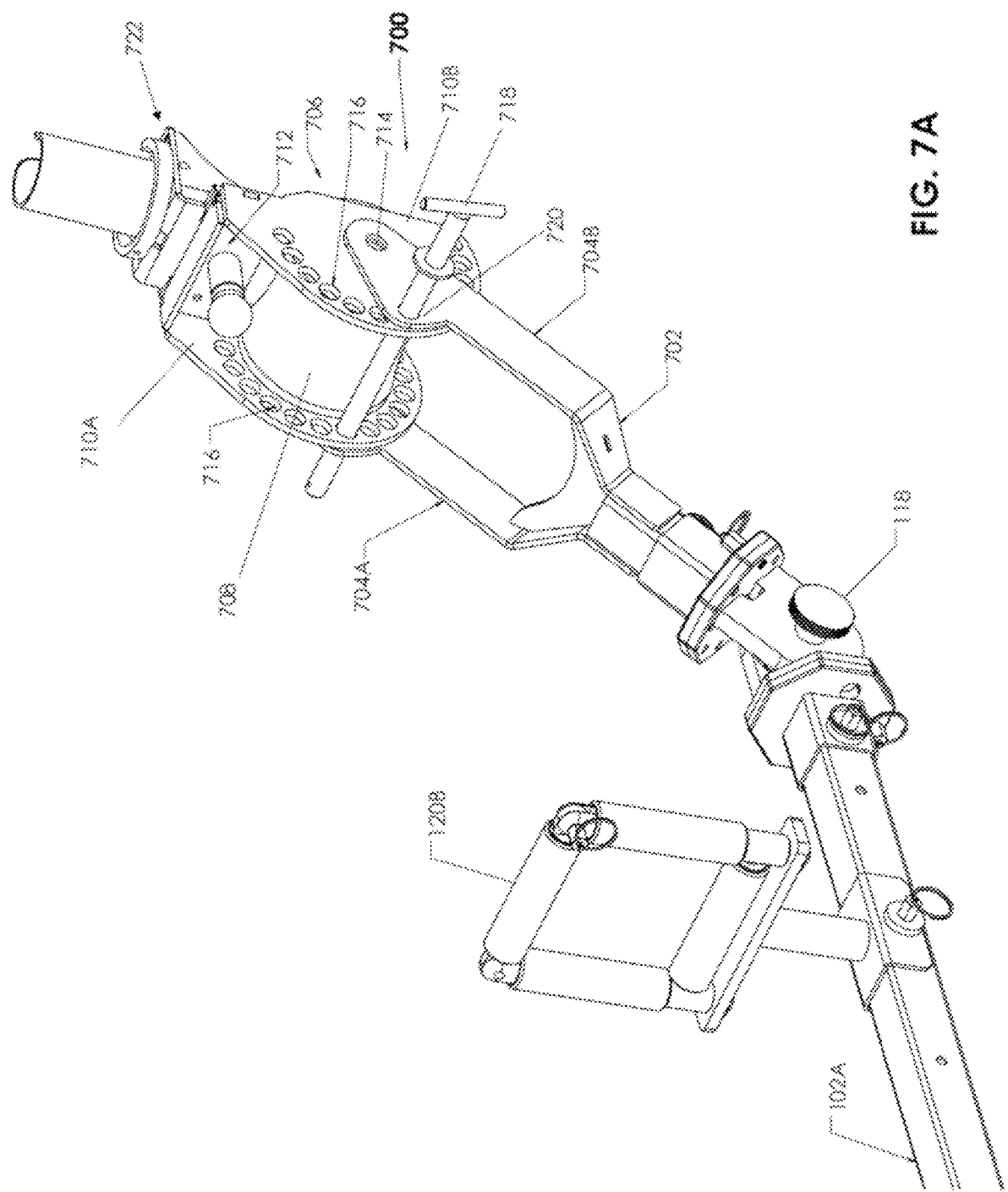
FIGS. 7A-7B are perspective views of a feeder attachment, according to an illustrative embodiment.
Figure 7B:
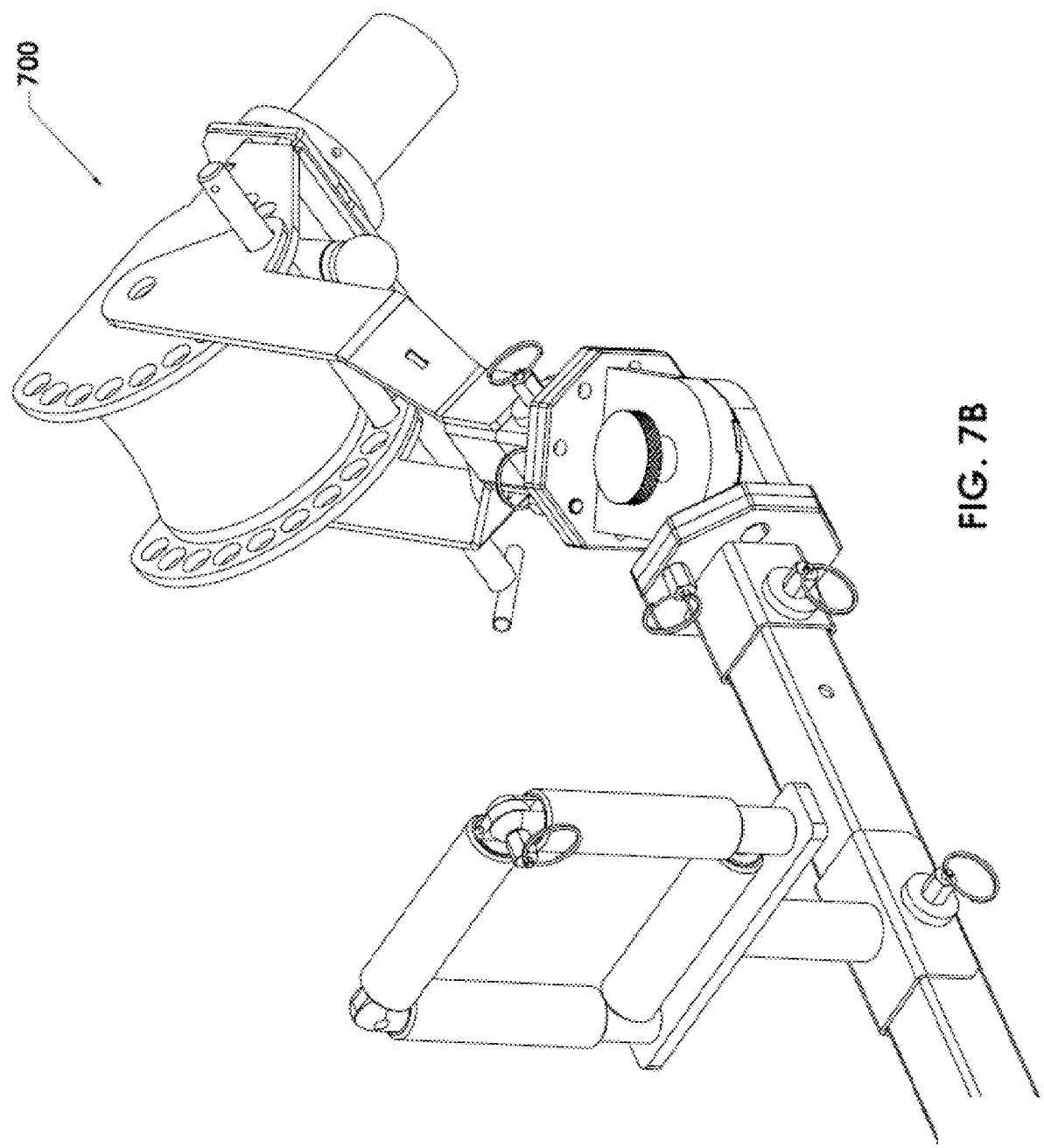

Once conductors that have been guided by the conductor guide system 100 arrive at a destination, such as a conduit, raceway, or cable track, the conductors can be directed to an opening of the conduit, raceway, or cable track by the feeder attachment 700, as shown in FIGS. 7A and 7B. According to embodiments, the feeder attachment 700 includes a brace portion 702 having a Y-shaped configuration attached, at a first end, to the joint 118. The joint 118 allows the feeder attachment 700 to be rotated about each of the first pivot point 446, the second pivot point 448, and the third pivot point 450, shown in FIG. 4A, to cause the feeder attachment 700 to have angles of elevation or depression relative to the xy-plane; to allow the angles of elevation or depression relative to the xy-plane of the feeder attachment 700 to be varied, one example of which is shown by comparing FIGS. 7A and 7B; and to allow the angle between the feeder attachment 700 and a base section also connected to the joint 118, such as the first base section 102A, to be varied. Allowing the feeder attachment 700 to be configured to have angles of elevation or depression relative to the xy-plane allows the feeder attachment 700 to guide conductors into overhead conduits, raceways, and cable trays as well as into underground conduits. According to embodiments, the joint 118 allows the feeder attachment 700 to be configured, based on the assembly illustrated by FIG. 7A, to extend variously into the three-dimensional space defined by the octants I, II, V, and VI created by the intersection of the x-axis, y-axis, and z-axis, as shown in FIG. 5G, and allows the first base section 102A to be configured to extend variously into the three-dimensional space defined by the octants III, IV, VII, and VIII created by the intersection of the x-axis, y-axis, and z-axis, as also shown in FIG. 5G.

As the brace portion 702 extends from the first end to a second end, the brace portion 702 divides into a first prong 704A and a second prong 704B. According to embodiments, an adapter bracket 706 is retained between the first prong 704A and the second prong 704B of the brace portion 702 via a pivot shaft 714, allowing the adapter bracket 706 to rotate relative to the brace portion 702 to help direct one or more conductors feeding through the roller assembly 120A into a conduit, raceway, or cable tray. According to embodiments, the adapter bracket 706 includes a pair of plates 710A and 710B having a series of holes 716 passing through each of the plates 710A, 710B that are concentric to the pivot shaft 714. A pin 718 may be inserted through a hole 720 passing through the second prong 704B, through the holes 716 of the plates 710A and 710B aligned with the hole 720, and through a hole of the first prong 704A corresponding to the hole 720 of the second prong 704B to lock the adapter bracket 706 in a desired orientation for directing the conductors feeding through the roller assembly 120A into a conduit, raceway, or cable tray. According to some embodiments, a pulley 708 is mounted on the pivot shaft 714 and retained between the pair of plates 710A and 710B. The pulley 708 supports the movement and change of direction of the conductors as the conductors are feed into a conduit, raceway, or cable tray. The adapter bracket 706 may also include a surface 712 to which an adapter 722 may be mounted. The adapter 722 may be bolted to the surface 712 of the adapter bracket 706 or attached via keyed slots or other suitable attachment elements. According to embodiments, the adapter 722 is configured to engage a conduit to brace at least a portion of the conductor guide system 100 against the conduit and aid in feeding one or more conductors being directed by the conductor guide system 100 into the conduit.

The subject matter described above is provided by way of illustration only and should not be construed as limiting. Various modifications and changes may be made to the subject matter described herein without following the example embodiments and applications illustrated and described, and without departing from the true spirit and scope of the present invention, which is encompassed in the following claims.

What is claimed is:

1. A conductor guide system comprising:
   a first base section;
   a second base section;
   a joint for assembling the first base section and the second base section in series; and
   a roller assembly for holding one or more linear elements, wherein the roller assembly comprises a head portion and a foot, wherein the roller assembly is mountable on one of the first base section or the second base section via the foot, wherein the roller assembly is repositionable along a length of at least one of the first base section or the second base section, and wherein the head portion of the roller assembly is spaced apart from the foot of the roller assembly and from the one of the first base section or the second base section when the roller assembly is mounted on the one of the first base section or the second base section.

2. The conductor guide system of claim 1, wherein the first base section comprises a plurality of tubular members.

3. The conductor guide system of claim 2, wherein at least a first tubular member of the plurality of tubular members of the first base section telescopes within a second tubular member of the plurality of tubular members of the first base section.

4. The conductor guide system of claim 1, wherein the roller assembly, when mounted on the one of the first base section or the second base section, holds the one or more linear elements off of the one of the first base section or the second base section on which the roller assembly is mounted.

5. The conductor guide system of claim 1, wherein the second base section comprises a plurality of tubular members.

6. The conductor guide system of claim 5, wherein at least a first tubular member of the plurality of tubular members of the second base section telescopes within a second tubular member of the plurality of tubular members of the second base section.

7. The conductor guide system of claim 1, wherein at least one of the first base section or the second base section is adjustable to a plurality of lengths.

8. The conductor guide system of claim 1, wherein the joint comprises a first pivot point, a second pivot point, and a third pivot point, and wherein the first base section is rotatable relative to the second base section via the first pivot point, the second pivot point, and the third pivot point of the joint.

9. The conductor guide system of claim 8, wherein the second base section is rotatable relative to the first base section via the first pivot point, the second pivot point, and the third pivot point of the joint.

10. The conductor guide system of claim 1, wherein the joint allows the first base section and the second base section to be placed in a linear configuration, an angled configuration, and a compound angled configuration relative one another.

11. The conductor guide system of claim 1, wherein the joint comprises:
   a first connector comprising
      a first piece comprising
         an outside plate, and
         a post for connecting the joint to the first base section, and
      a second piece comprising
         an inside plate rotatably connected to the outside plate of the first piece of the first connector, and
         a mating portion; and
   a second connector comprising
      a first piece comprising
         an outside plate, and
         a post for connecting the joint to the second base section, and
      a second piece comprising
         an inside plate rotatably connected to the outside plate of the first piece of the second connector, and
         a mating portion rotatably coupled to the mating portion of the second piece of the first connector.

12. A conductor guide system comprising:
   a first base section;
   a second base section;
   a joint for assembling the first base section and the second base section in series, wherein the joint comprises a first pivot point, a second pivot point, and a third pivot point, and wherein the first base section is rotatable relative to the second base section via the first pivot point, the second pivot point, and the third pivot point of the joint; and
   a roller assembly for holding one or more linear elements, wherein the roller assembly comprises a head portion and a mounting portion, and wherein the one or more linear elements is maintained within the head portion of the roller assembly.

13. The conductor guide system of claim 12, wherein the joint allows the first base section and the second base section to be placed in a linear configuration, an angled configuration, and a compound angled configuration relative one another.

14. The conductor guide system of claim 12, wherein the joint comprises:
   a first connector comprising
      a first piece comprising
         an outside plate, and
         a post for connecting the joint to the first base section, and
      a second piece comprising
         an inside plate rotatably connected to the outside plate of the first piece of the first connector, and
         a mating portion; and
   a second connector comprising
      a first piece comprising
         an outside plate, and
         a post for connecting the joint to the second base section, and
      a second piece comprising
         an inside plate rotatably connected to the outside plate of the first piece of the second connector, and
         a mating portion rotatably coupled to the mating portion of the second piece of the first connector.

15. The conductor guide system of claim 12, wherein at least one of the first base section or the second base section is adjustable to a plurality of lengths.

16. The conductor guide system of claim 15, wherein the first base section comprises a plurality of tubular members and wherein the second base section comprises a plurality of tubular members.

17. The conductor guide system of claim 12, wherein the roller assembly is repositionable along a length of the first base section and a length of the second base section.

18. The conductor guide system of claim 12, wherein the mounting portion of the roller assembly comprises a foot for receiving one of the first base section or the second base section to mount the roller assembly on the one of the first base section or the second base section, and wherein the head portion of the roller assembly is spaced apart from the foot of the mounting portion of the roller assembly.

19. A conductor guide system comprising:
   a first base section;
   a second base section, wherein at least one of the first base section or the second base section is adjustable to a plurality of lengths;
   a joint for assembling the first base section and the second base section in series; and
   a roller assembly for holding one or more linear elements, wherein the roller assembly comprises a head portion and a foot, wherein the roller assembly is mountable on one of the first base section or the second base section via the foot, and wherein the head portion of the roller assembly is spaced apart from the foot of the roller assembly and from the one of the first base section or the second base section when the roller assembly is mounted on the one of the first base section or the second base section.

20. The conductor guide system of claim 19, wherein the joint comprises a first pivot point, a second pivot point, and a third pivot point, and wherein the first base section is rotatable relative to the second base section via the first pivot point, the second pivot point, and the third pivot point of the joint.

* * * * *